US009616707B2

(12) United States Patent
Jochim et al.

(10) Patent No.: US 9,616,707 B2
(45) Date of Patent: Apr. 11, 2017

(54) OMNIDIRECTIONAL PINION WHEEL

(71) Applicant: Amazon Technologies, Inc., Seattle, WA (US)

(72) Inventors: Jayson Michael Jochim, Seattle, WA (US); Martin Peter Aalund, Seattle, WA (US); David Bruce McCalib, Jr., Seattle, WA (US); Jon Stuart Battles, Kirkland, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/752,120

(22) Filed: Jun. 26, 2015

(65) Prior Publication Data

US 2016/0375723 A1    Dec. 29, 2016

(51) Int. Cl.
*B60B 19/02*    (2006.01)
*B60B 19/00*    (2006.01)
*B60B 19/12*    (2006.01)

(52) U.S. Cl.
CPC ............ *B60B 19/003* (2013.01); *B60B 19/02* (2013.01); *B60B 19/12* (2013.01); *B60B 2900/351* (2013.01); *B60B 2900/551* (2013.01); *B60Y 2200/62* (2013.01)

(58) Field of Classification Search
CPC ..... B60B 19/003; B60B 19/12; B60B 19/125; B60B 11/02; B60B 11/06; B60B 25/006
See application file for complete search history.

(56) References Cited

U.S. PATENT DOCUMENTS

| 4,483,407 | A | 11/1984 | Iwamoto |
| 7,101,139 | B1 | 9/2006 | Benedict |
| 7,861,844 | B2 | 1/2011 | Hayduchok |
| (Continued) |

FOREIGN PATENT DOCUMENTS

EP    2664526    11/2013

OTHER PUBLICATIONS

Tadakuma, K. et al. "Basic running test of the cylindrical tracked vehicle with sideways mobility." Intelligent Robots and Systems, 2009. IROS 2009. IEEE/RSJ International Conference on. 2009. pp. 1679-1684.

(Continued)

*Primary Examiner* — Erez Gurari
(74) *Attorney, Agent, or Firm* — Thomas | Horstemeyer; Michael J. D'Aurelio; Jason M. Perilla

(57) ABSTRACT

Concepts of an omnidirectional pinion wheel are described. In one embodiment, the wheel includes a hub, first and second annular rims each including inner and outer rim surfaces, spokes that extend from the hub to the first and second annular rims, a pinion ring including pinion rods that extend between the inner surfaces of the first and second annular rims, and first and second annular rings of rollers affixed on the outer surfaces of the first and second annular rims. Using an axis of freedom of the rollers, the wheel can move sideways in addition to forward and backward. Further, when used with a vertical rack gear, the wheel can provide vertical displacement by engagement between teeth of the gear and the pinion ring. Additionally, various racks and tracks with teeth for pinion ring engagement are described along with an example vehicle capable of vertical displacement using the wheels.

20 Claims, 16 Drawing Sheets

(56) References Cited

U.S. PATENT DOCUMENTS

| | | |
|---|---|---|
| 7,931,431 B2 | 4/2011 | Benedict |
| 8,628,289 B1 | 1/2014 | Benedict |
| 9,004,200 B2 | 4/2015 | Ben-Tzvi |
| 2005/0134106 A1* | 6/2005 | Guile ............... B60B 19/003 301/5.23 |
| 2010/0140888 A1 | 6/2010 | McKinnon |
| 2010/0224427 A1 | 9/2010 | Nüchter |
| 2010/0270850 A1* | 10/2010 | Brudniok ........... B60B 19/003 301/5.23 |
| 2011/0067937 A1 | 3/2011 | Gomi et al. |
| 2016/0023511 A1 | 1/2016 | Liddiard |

OTHER PUBLICATIONS

Wada, et al. "Holonomic and Omnidirectional Vehicle with Conventional Tires." Mechatronics Development Group, Electronics Development Laboratory Fuji Electric Corporate Research and Development ,Ltd. IEEE International Conference in 1996. pp. 3671-3676.

International Search Report and Written Opinion from related PCT Application No. PCT/US16/33912, mailed Sep. 16, 2016.

* cited by examiner

OMNIDIRECTIONAL PINION WHEEL

BACKGROUND

Robotic systems can be useful in warehouse and fulfillment center operations. Among other tasks, robotic systems can be relied upon for picking, placing, and moving items. As another example, items can be moved from place to place in a warehouse using robotic systems to automate package handling operations. These robotic systems often rely upon one or more wheels. As one of the simple machines, a wheel is a circular component that can be rotated to facilitate movement or displacement. In connection with an axle, a wheel can be used to move objects by supporting a load while also permitting rotation that leads to displacement.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

DETAILED DESCRIPTION

Figure 1:
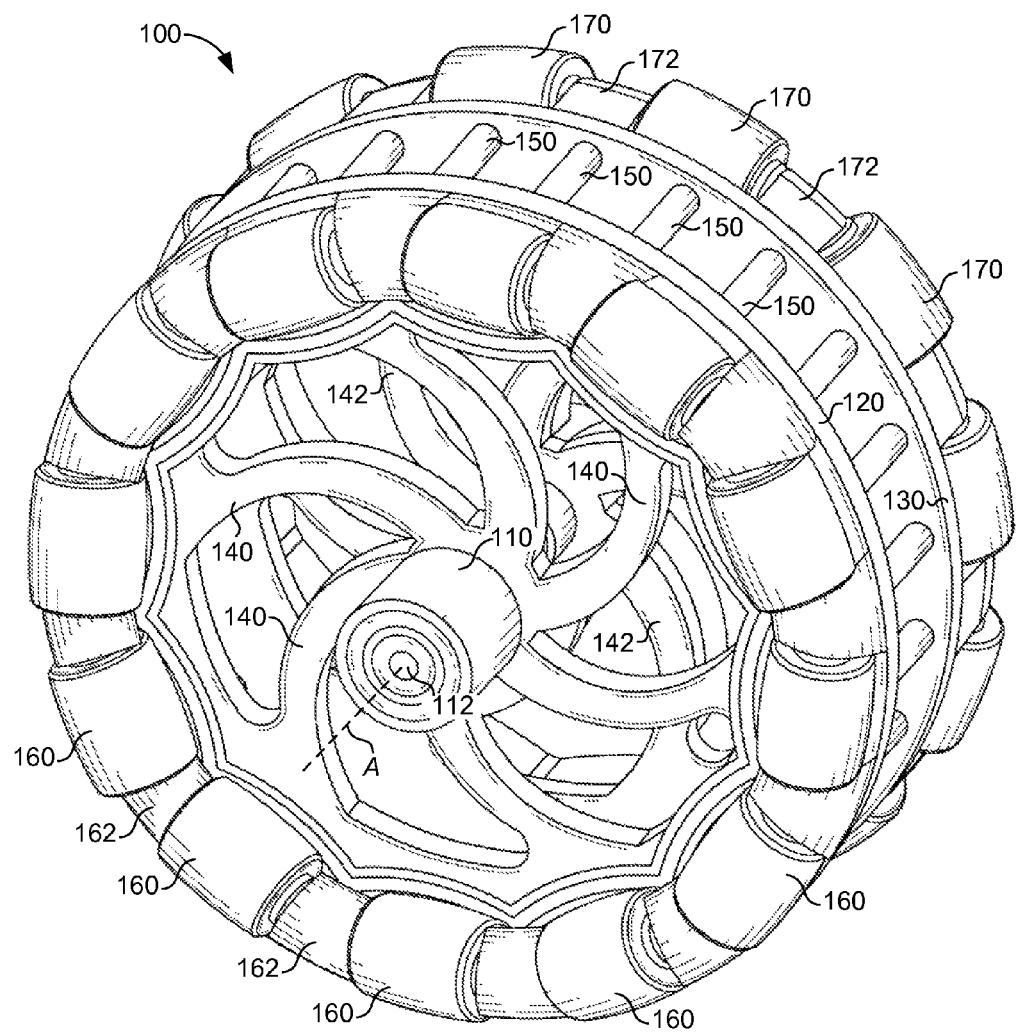
FIG. 1 illustrates a perspective view of an example omnidirectional pinion wheel according to various embodiments.

As noted above, a wheel is a circular component that can be rotated to facilitate movement or displacement. In connection with an axle, a wheel can be used to move objects by supporting a load while also permitting rotation that leads to displacement. However, a conventional wheel offers displacement only in the direction perpendicular to its axle. Thus, especially in tight or enclosed spaces, vehicles that incorporate wheels may be limited in their ability to change their direction of motion. For example, a vehicle may be able to travel forward and backward using its wheels, but the vehicle may not be able to stop and immediately move to the right or left without turning. Further, conventional wheels are not generally relied upon to provide vertical movement or displacement.

To address certain limitations of conventional wheels, embodiments of omnidirectional wheels, vehicles that include omnidirectional wheels, and systems and methods for omnidirectional transport are described herein. Various omnidirectional or mecanum wheels including structural features, such as pinion rings, for example, formed to engage with racks or tracks are described. The racks or tracks include teeth formed to engage with the structural features of the omnidirectional wheels as they rotate or drive along the tracks. Due to their design, the omnidirectional wheels are capable of holonomic or longitudinal and lateral movement on any given surface level. Further, when engaged with a rack or track that extends vertically, the wheels are also capable of vertical movement, because they remain engaged with the rack or track as it extends vertically. As such, the omnidirectional wheels can be maneuvered or driven in three orthogonal directions, including longitudinal, lateral, and vertical directions.

Example vehicles that incorporate the omnidirectional wheels described herein are likewise capable of longitudinal and lateral movement on any given surface level. Further, when the vehicles are positioned to engage with one or more racks or tracks that extend vertically, the vehicle is also capable of vertical movement, because it remains engaged with the rack or track as it extends vertically. Thus, the vehicle can be maneuvered in longitudinal and lateral directions on a first surface, driven in engagement with a rack or track to raise or lower the vehicle to a second surface, and then maneuvered in longitudinal and lateral directions on the second surface. Based on the ability to move in various directions among levels of dense storage racks in a materials handling facility, for example, the vehicle can be relied upon to pick and place items among the levels.

Example systems that incorporate vehicles having omnidirectional wheels and racks or tracks including teeth formed to engage with the wheels are also described. The racks or tracks can be positioned in any desired arrangement among multiple levels of storage racks in a materials handling facility, for example, to allow engagement of the vehicles with the tracks for three-dimensional movement, picking items on various levels, placing items on various levels, and other automated tasks.

Figure 2:
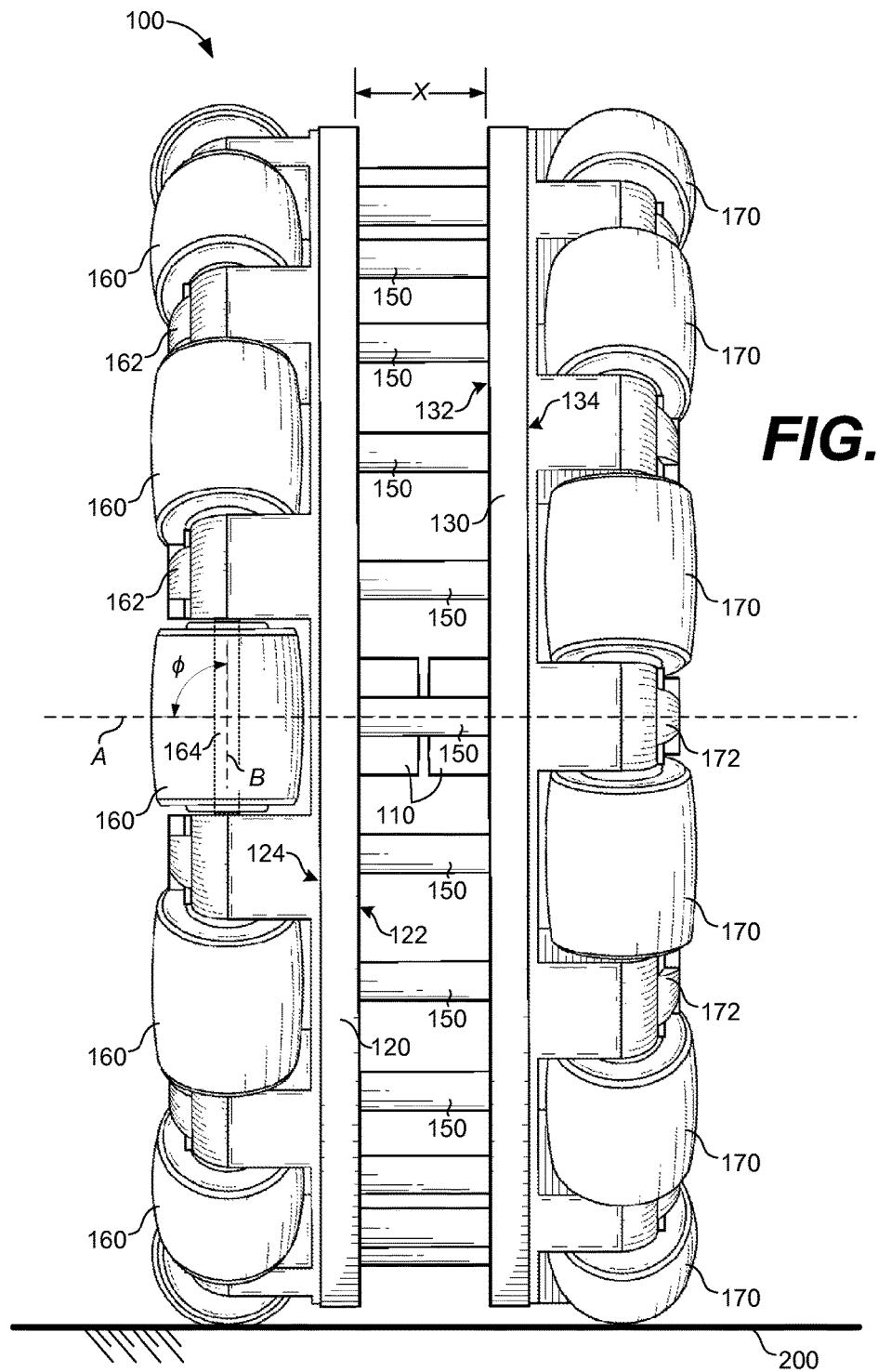
FIG. 2 illustrates a side view of the omnidirectional pinion wheel shown in FIG. 1 according to various embodiments.

Turning to the drawings, FIG. 1 illustrates a perspective view of an example omnidirectional pinion wheel 100 according to various embodiments, and FIG. 2 illustrates a side view of the omnidirectional pinion wheel 100 shown in FIG. 1. According to aspects of the embodiments described herein, the omnidirectional pinion wheel 100 can be used in a vehicle to achieve movement in three dimensions, such as in at least three orthogonal directions, as described in further detail below.

Before continuing, it is noted that the wheel 100 is not necessarily drawn to scale in FIG. 1. The wheel 100 can be any suitable size depending upon various factors, such as load-bearing capacity, space constraints, vehicle size, etc. Further, the relative sizing of the individual parts of the wheel 100 in FIGS. 1 and 2 is not intended to be limiting of the scope of the embodiments. In other words, in other embodiments, one or more of the parts of the wheel 100 can be larger or smaller as compared to that shown. Overall, rather than limiting the scope of the concepts described herein, the wheel 100 in FIGS. 1 and 2 is illustrated to convey the principles of omnidirectional wheels that incorporate a pinion, sprocket, or other related structure to facilitate vertical displacement. Finally, for clarity in illustration, where the wheel 100 (and other wheels described herein) includes several of the same or similar parts, only a subset of those parts is individually referenced in FIGS. 1 and 2, although the structure, function, and purpose of the remaining unreferenced parts can be understood by association.

Referring to FIGS. 1 and 2, the omnidirectional pinion wheel 100 includes a hub 110 having an axis of symmetry A and a center bore 112. The wheel 100 further includes a first annular rim 120, a second annular rim 130, a first wheel body that extends radially away from the hub 110 to the first annular rim 120, and a second wheel body that extends radially away from the hub 110 to the second annular rim 130. In the embodiment illustrated in FIGS. 1 and 2, the first wheel body includes spokes 140, and the second wheel body includes spokes 142. In other embodiments, the body of the wheel 100 can be formed from spokes that differ in shape, size, position, and/or number from that illustrated in FIGS. 1 and 2. Additionally or alternatively, the body of the wheel 100 can be formed as a solid or perforated disk of material or as any other supporting wheel body structure in any suitable thickness.

Referring to FIG. 2, the first annular rim 120 includes a first rim inner surface 122 and a first rim outer surface 124, and the second annular rim 130 includes a second rim inner surface 132 and a second rim outer surface 134. The first rim inner surface 122 is spaced apart from the second rim inner surface 132 by a distance X in the direction of the axis of symmetry A of the hub 110. As shown in FIGS. 1 and 2, the wheel 100 further includes a pinion ring. The pinion ring includes pinion rods 150 that extend in the direction of the axis of symmetry A between the first rim inner surface 122 and the second rim inner surface 132. In FIG. 2, the pinion rods 150 are spaced substantially evenly along the first annular rim 120 and the second annular rim 130, although other spacings can be used. As described in further detail below, the pinion rods 150 of the pinion ring can engage into the teeth of a rack to achieve vertical displacement using the wheel 100.

To achieve movement or displacement in the direction of the axis of symmetry A of the hub 110, the wheel 100 includes first and second annular rings of rollers. The first annular ring of rollers includes the first rollers 160 arranged in a first ring and affixed to the first rim outer surface 124 of the first annular rim 120, and the second annular ring of rollers includes the second rollers 170 arranged in a second ring and affixed to the second rim outer surface 134 of the second annular rim 130. The first rollers 160 are affixed to the first rim outer surface 124 through axles that provide a rotational axis of freedom about an axis of symmetry. Similarly, the second rollers 170 are affixed to the second rim outer surface 134 through axles that provide a rotational axis of freedom about an axis of symmetry. The axles for the first rollers 160 and the second rollers 170 are secured or held in place by the first roller ring abutments 162 and the second roller ring abutments 172, respectively. The first roller ring abutments 162 are secured to or integrally formed with the first rim outer surface 124, and second roller ring abutments 172 are secured to or integrally formed with the second rim outer surface 134. As shown in FIG. 2, the first rollers 160 and the second rollers 170 extend a greater distance radially away from the hub 110 than the first annular rim 120 and the second annular rim 130.

In FIG. 2, an axle 164 of one of the rollers 160 is shown by hidden lines. The axle 164 provides a rotational axis of freedom about the axis of symmetry B. In the embodiment of the wheel 100 shown in FIGS. 1 and 2, the axis of symmetry B is substantially orthogonal to the axis of symmetry A of the hub 110. That is, the angle φ between the axis of symmetry B and the axis of symmetry A is about 90°.

The first annular ring of the first rollers 160 is symmetrically offset from the second annular ring of the second rollers 170. That is, as shown in FIGS. 1 and 2, the first rollers 160 are aligned in part across the wheel 100 with the second roller ring abutments 172, and the second rollers 170 are aligned in part across the wheel 100 with the first roller ring abutments 162. Due in part to this offset alignment of the first rollers 160 and the second rollers 170, the wheel 100 can stand upright on the surface 200 in FIG. 2 with one of the first rollers 160 and one of the second rollers 170 resting on the surface 200, with one of the first rollers 160 and two of the second rollers 170 resting on the surface 200, or with two of the first rollers 160 and one of the second rollers 170 resting on the surface 200.

Further, using the rotational axis of freedom of the first rollers 160 and the second rollers 170, the wheel 100 can be displaced on the surface 200 in the direction of the axis of symmetry A of the hub 110 (i.e., sideways to the right or left of the page in FIG. 2) in response to a force on the wheel 100 which is, at least in part, in the direction of the axis of symmetry A. Further, in response to rotation of the wheel 100 about the axis of symmetry A, the wheel can be displaced on the surface 200 in a direction substantially orthogonal to the direction of the axis of symmetry A (i.e., forward into or backward out of the page in FIG. 2). As described in further detail below, the wheel 100 can be rotated by a motor or other engine through an axle secured in the center bore 112 of the hub 110. Also, the first rollers 160 and the second rollers 170 can be either free to rotate without being independently driven or can be directly driven by motors in the wheel 100, such as by micro-motors embedded in the first roller ring abutments 162 and the second roller ring abutments 172.

The wheel 100 can be formed from any suitable material or materials depending upon its application of use and/or other factors. For example, the body of the wheel 100 can be formed from metal, plastic, or any other suitable material or combination of materials, without limitation. Similarly, the first rollers 160, the second rollers 170, the pinion rods 150, and the other parts of the wheel 100 can be formed from metal, plastic, or any other suitable material or combination of materials, without limitation. The type of material or materials from which the wheel 100 is formed can be selected based on the application for which the wheel 100 is designed. For example, if the wheel 100 is designed for transportation of relatively large and/or heavy items, then the wheel 100 can be constructed from a material of relatively high strength, even if the material is heavy. On the other hand, if the wheel 100 is designed for transportation of relatively small and/or light items, then the wheel 100 can be constructed from a material of suitable strength but relatively lighter weight.

Among embodiments, the wheel 100 can be manufactured and assembled in any suitable manner for sufficient strength and durability for the application. For example, the body of the wheel 100 and the pinion rods 150 can be formed integrally together, or holes or other openings can be drilled or otherwise formed in the first rim inner surface 122 and the second rim inner surface 132 for insertion of the pinion rods 150. Likewise, the body of the wheel 100, the first roller ring abutments 162, and the second roller ring abutments 172 can be formed integrally together, or the first roller ring abutments 162 and the second roller ring abutments 172 can be secured to the first rim outer surface 124 and the second rim outer surface 134. It is noted that the wheel 100 can include other parts, such as bearings, screws, bolts, or other fasteners. It is also noted that an axle can be secured to the wheel 100 using fasteners, mating cross-sectional profiles of the center bore 112 and the axle, friction, or other ways.

Figure 3:
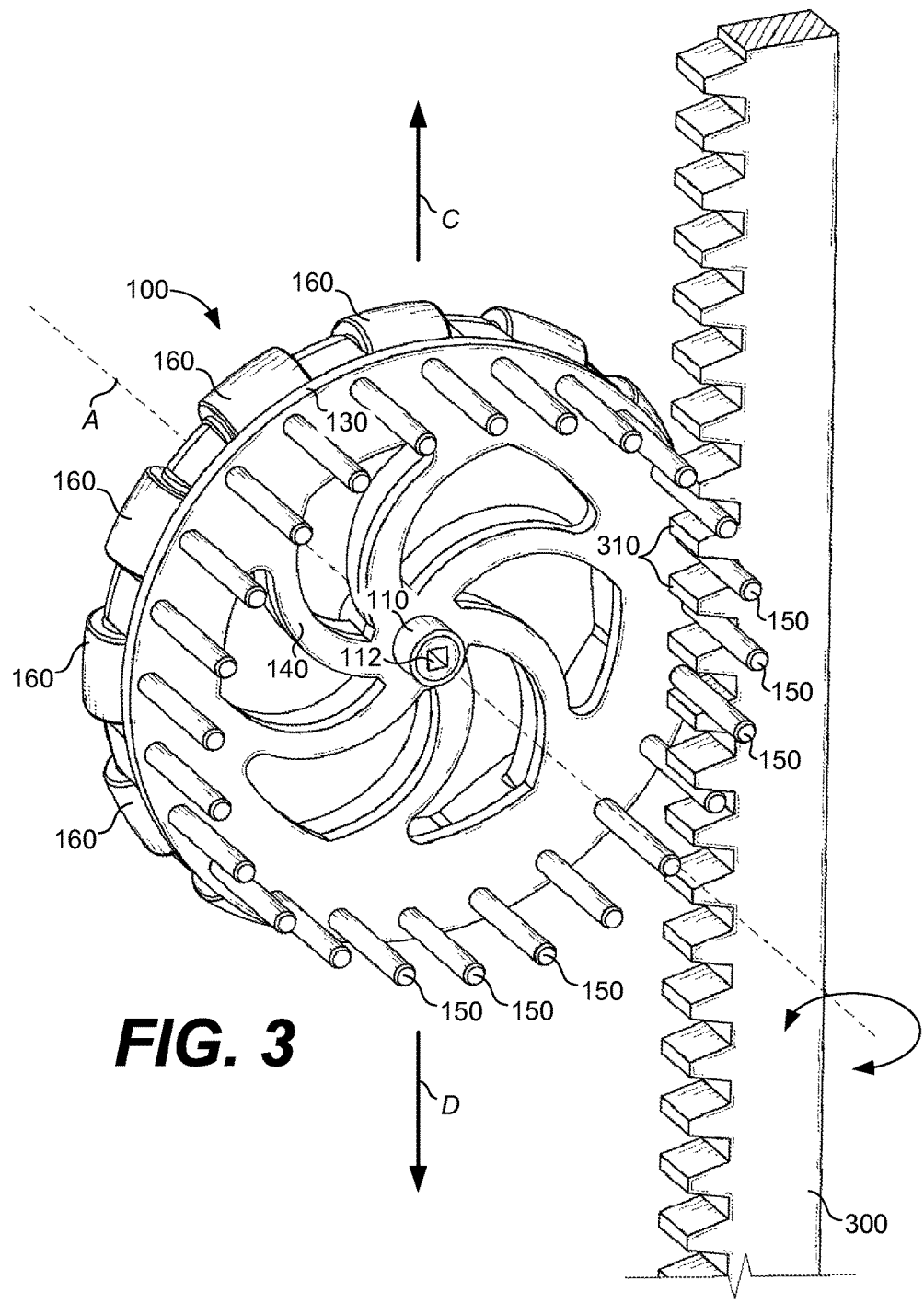
FIG. 3 illustrates a cross-sectional perspective view of the omnidirectional pinion wheel shown in FIG. 1 engaged with a rack according to various embodiments.

To illustrate how the wheel 100 can be used to achieve vertical displacement, FIG. 3 illustrates a cross-sectional perspective view of the wheel 100 engaged with a rack 300. It is noted that, because space in materials handling and other facilities is often limited, many facilities make use of multiple floors, layers, levels, or platforms in rack or shelving structures. Without the use of ramps, elevators, etc., it may not be possible for vehicles in such a facility to reach or traverse across multiple floors or levels. In that context, using the wheel 100, a vehicle can engage a rack, such as the rack 300, to climb up the side or edge of shelving or other support structures to reach various levels in a facility. An example of such a vehicle is described in further detail below with reference to FIGS. 7A and 7B.

Referring to FIG. 3, the second annular rim 130, second rollers 170, and second roller ring abutments 172 are omitted from view, so that the engagement of the pinion rods 150 with the rack 300 can be more clearly seen. As shown, the pinion rods 150 engage with the teeth 310 of the rack 300. More particularly, as the wheel 100 is rotated clockwise about the axis of symmetry A, the wheel 100 is displaced vertically in the direction C because the pinion rods 150 progressively engage higher teeth 310 along the rack 300. Similarly, as the wheel 100 is rotated counter-clockwise about the axis of symmetry A, the wheel 100 is displaced vertically in the direction D because the pinion rods 150 progressively engage lower teeth 310 along the rack 300. As described below, in certain embodiments, teeth similar to the teeth 310 of the rack 300 can be formed inside a partially-enclosed track or rail, and the wheel 100 can be driven into the track or rail for vertical displacement between different platforms in a materials handling facility, for example. An example of such a system is described in further detail below with reference to FIGS. 10A-10C, 11A, 11B, 12A, and 12B.

Before turning to the other example wheel embodiments in FIGS. 4, 5A, 5B, and 6, it is noted that the sizing, number, and relative positions of the pinion rods 150 of the wheel 100 can vary from that shown in FIGS. 1-3. For example, the pinion rods 150 can extend a distance that is greater or smaller than the distance X shown in FIG. 2. Also, the wheel 100 can include a greater or lesser number of pinion rods 150, and the pinion rods 150 can be more closely spaced together or further spaced apart. Also, the pinion rods 150 can be placed closer to or further apart from the first annular rim 120 and the second annular rim 130. The sizing, number, and relative positions of the pinion rods 150 can be chosen based in part on the amount of weight to be carried and lifted by the wheel 100 and/or other factors. Similarly, the sizing, number, and relative positions of the teeth 310 of the rack 300 can be chosen based in part on the amount of weight to be carried and/or lifted by the wheel 100. Finally, it is noted that, although the pinion rods 150 are illustrated in FIGS. 1-3 as having circular cross sections, the pinion rods 150 can be formed having any suitable cross-sectional shape, such as triangular, square, trapezoidal, or other shapes.

Figure 4:
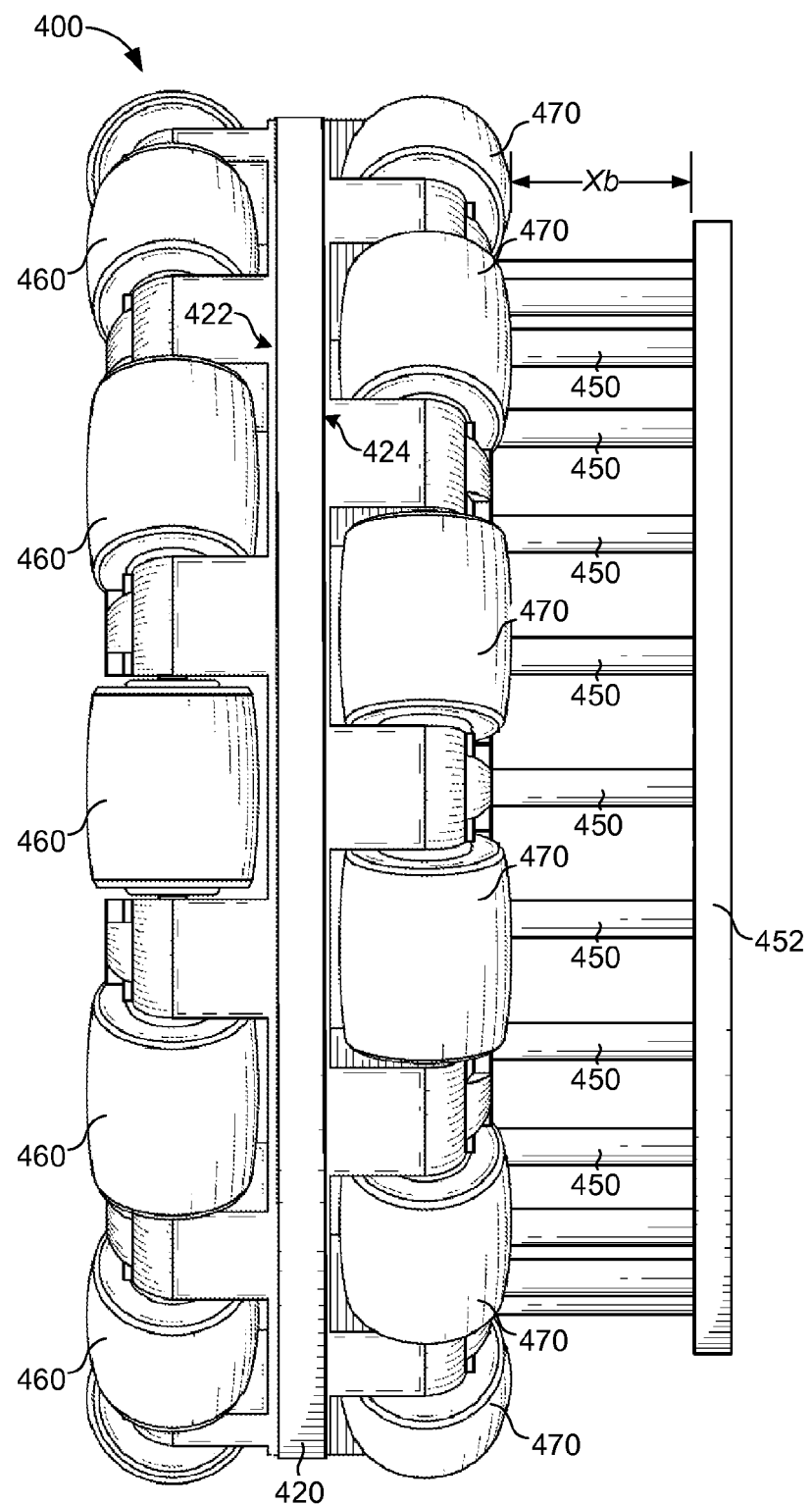
FIG. 4 illustrates a perspective view of another example omnidirectional pinion wheel according to various embodiments.

FIG. 4 illustrates a perspective view of another example omnidirectional pinion wheel 400 according to various embodiments. Among other elements similar to the wheel 100, the wheel 400 includes a hub (not shown in view), an annular rim 420, and a wheel body (not shown in view) that extends radially away from the hub to the annular rim 420. The annular rim 420 includes a first rim surface 422 and a second rim surface 424.

The wheel 400 further includes first and second annular rings of rollers. The first annular ring of rollers includes the first rollers 460 arranged in a first ring and affixed to the first rim surface 422 of the annular rim 420, and the second annular ring of rollers includes the second rollers 470 arranged in a second ring and affixed to the second rim surface 424 of the annular rim 420. As shown in FIG. 4, the first rollers 460 and the second rollers 470 extend a greater distance radially away from the hub than the annular rim 420.

The wheel 400 further includes a pinion ring. The pinion ring includes pinion rods 450 that extend out a distance Xb in a direction of an axis of symmetry of the hub of the wheel 400 from the wheel body of the wheel 400 to the ring rim 452. The pinion rods 450 are spaced substantially evenly in a ring similar to the pinion ring of the wheel 100 in FIGS. 1 and 2, but extending from one side of the wheel 400 rather than in the center between the two annular rings of rollers. Similar to the pinion rods 150, the pinion rods 450 can engage into the teeth of a rack to achieve vertical displacement when the wheel 400 is rotated. The pinion rods 450 are shown in FIG. 4 to extend a distance Xb that is different than the distance X in FIG. 2, to provide an example of variations among the embodiments, but the pinion rods 450 can extend any suitable distance out from the wheel body of the wheel 400. Also, the sizing, shape, number, and relative positions of the pinion rods 450 of the wheel 400 can vary from that shown in FIG. 4.

The wheel 400 is presented as an example of an alternative embodiment consistent with the concepts of omnidirectional pinion wheels described herein. In other variations, a second pinion ring can be added extending from the left side of the wheel 400 in FIG. 4. Additionally, an omnidirectional pinion wheel can be formed as several concentric layers of pinion rods and roller rings, with the outer-most rings being rings of pinion rods, rings of rollers, or a ring of pinion rods on one side of the wheel and a ring of rollers on the other side of the wheel.

Figure 5A:
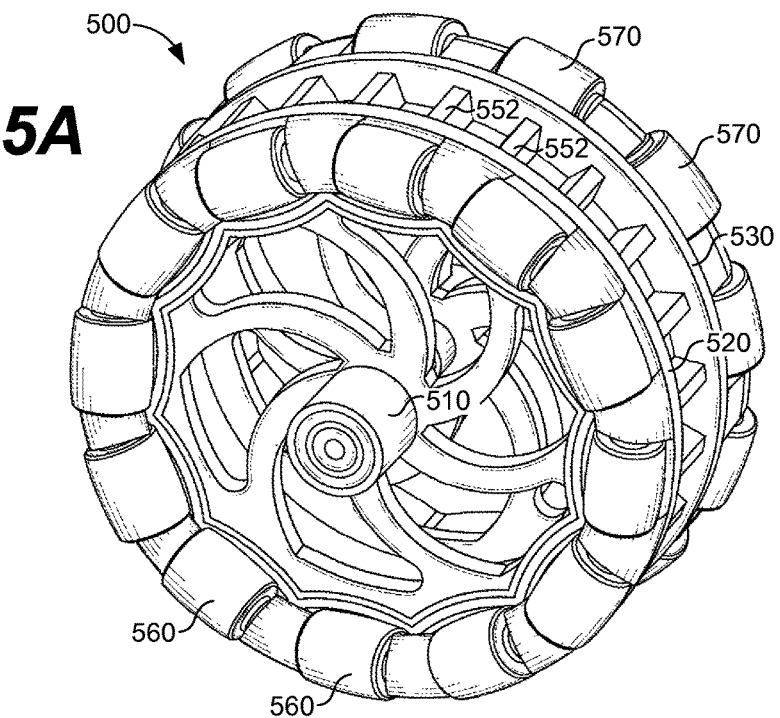
FIG. 5A illustrates a perspective view of another example omnidirectional pinion wheel according to various embodiments.
Figure 5B:
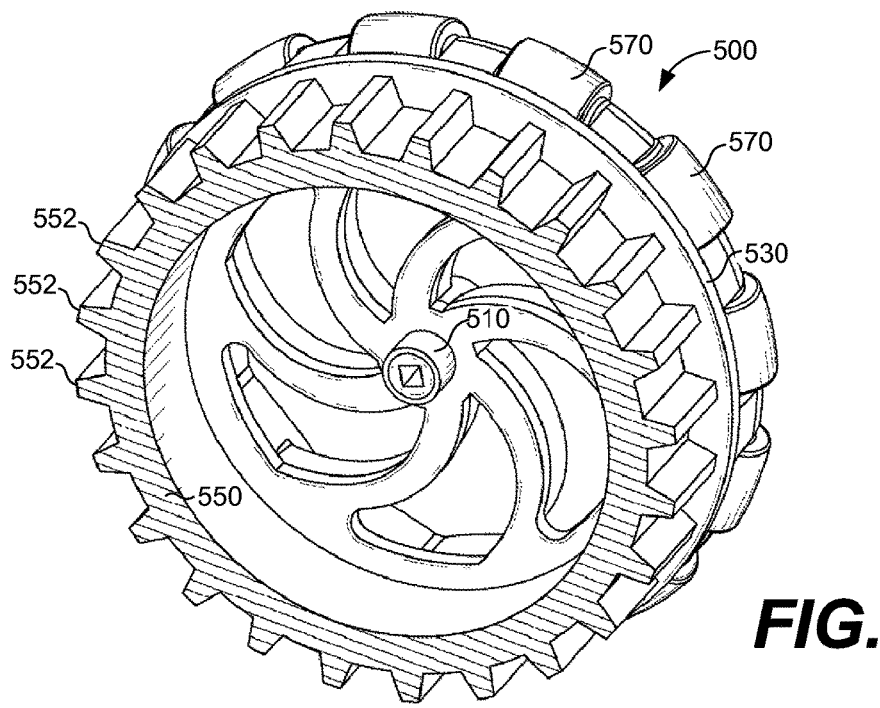
FIG. 5B illustrates a cross-sectional perspective view of the example omnidirectional pinion wheel shown in FIG. 5A according to various embodiments.

Turning to other embodiments consistent with the concepts described herein, FIG. 5A illustrates a perspective view of an example omnidirectional pinion wheel 500, and FIG. 5B illustrates a cross-sectional perspective view of the example omnidirectional pinion wheel 500 in FIG. 5A. Among other elements similar to the wheel 100, the wheel 500 includes a hub 510, a first annular rim 520, a second annular rim 530, a first annular ring of rollers including the first rollers 560, and a second annular ring of rollers including the second rollers 570.

Although similar to the wheel 100 in FIGS. 1 and 2, the wheel 500 includes a sprocket 550 formed to extend between the first annular rim 520 and the second annular rim 530 rather than pinion rods. The sprocket 550 includes teeth 552 that extend out around the circumference of the sprocket 550. The teeth 552 can engage the teeth of a rack, similar to the rack 300 in FIG. 3, so that the wheel 500 can be used to achieve vertical displacement.

Figure 6:
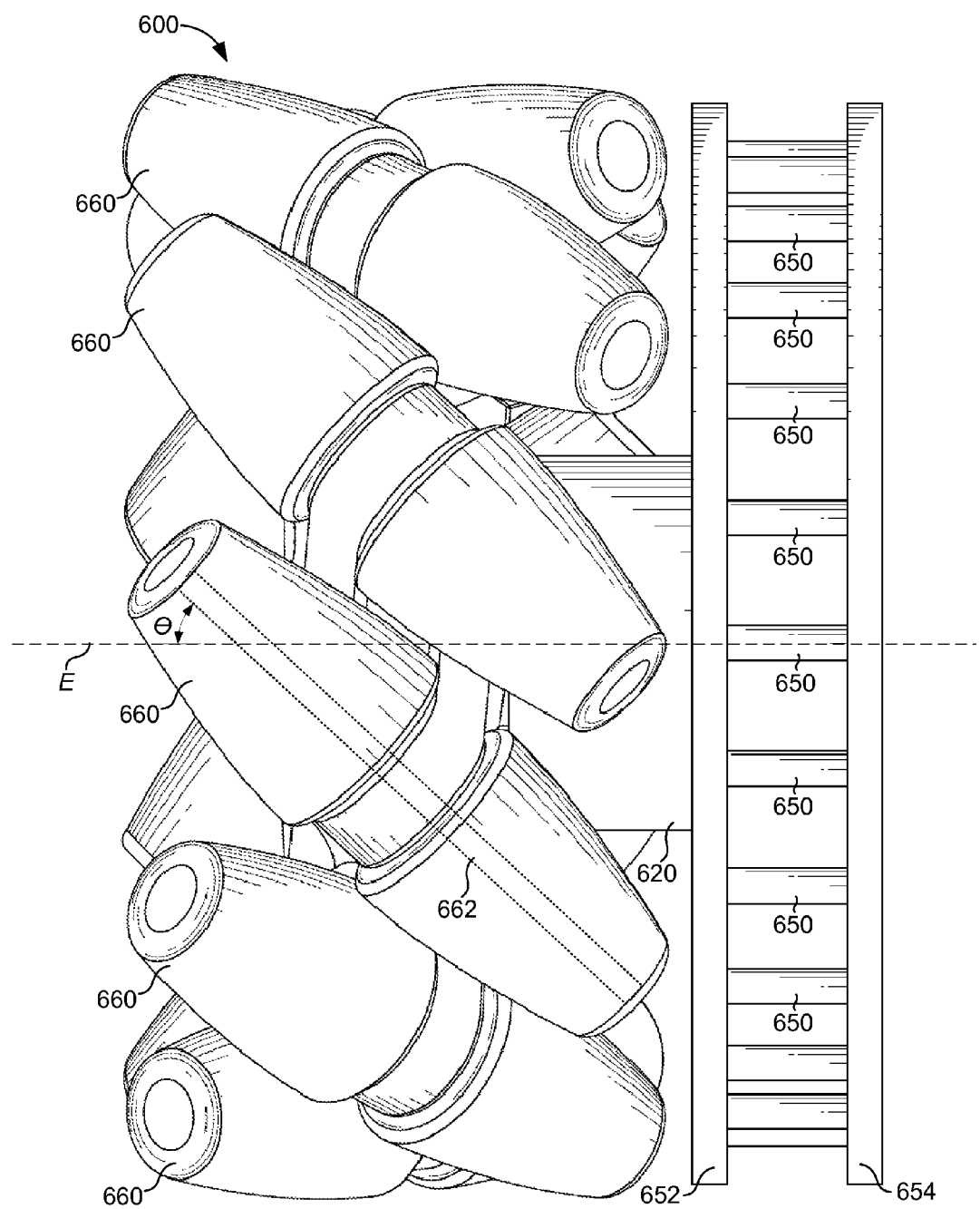
FIG. 6 illustrates a side view of another example omnidirectional pinion wheel according to various embodiments.

FIG. 6 illustrates a side view of another example omnidirectional pinion wheel 600. As shown, the wheel 600 is a type of mecanum wheel including a pinion ring formed at one side. The wheel 600 includes a hub 620 having an axis of symmetry E, a pinion ring including pinion rods 650 that are secured to the hub 620 and extend between a first ring rim 652 and a second ring rim 654, and an annular ring of rollers including rollers 660 secured to the hub 620. An axle 662 of one of the rollers 660 is shown by hidden lines in FIG. 6. The axle 662 extends at an angle θ as compared to the axis of symmetry E of the hub 620. In one embodiment, the angle θ is about 45°, although other angles are within the scope of the embodiments.

As with the wheels 400 and 500, the wheel 600 is presented as an example of an alternative embodiment consistent with the concepts of omnidirectional pinion wheels described herein. In other variations, a second pinion ring can be added extending from the left side of the wheel 600 in FIG. 6. Additionally, an omnidirectional pinion wheel can be formed as several concentric layers of pinion rods and roller rings, with the outer-most rings being rings of pinion rods, rings of rollers, or a ring of pinion rods on one side of the wheel and a ring of rollers on the other side of the wheel.

Figure 7A:
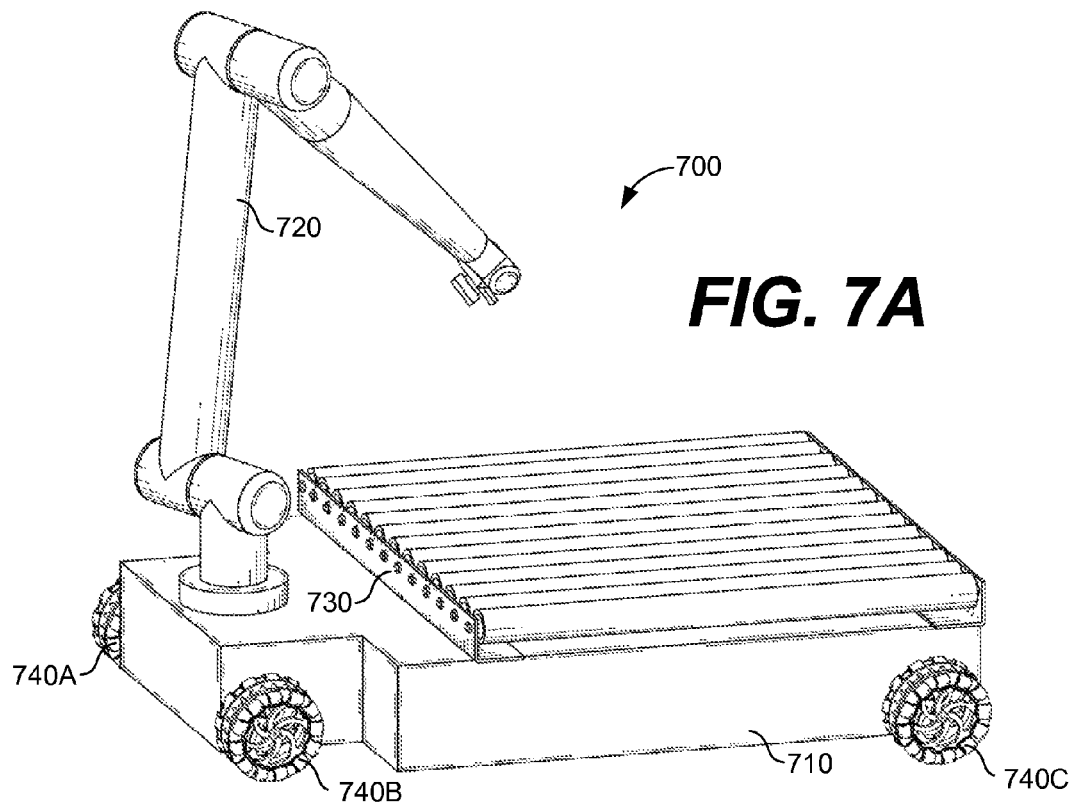
FIG. 7A illustrates an example vehicle including omnidirectional pinion wheels according to various embodiments.
Figure 7B:
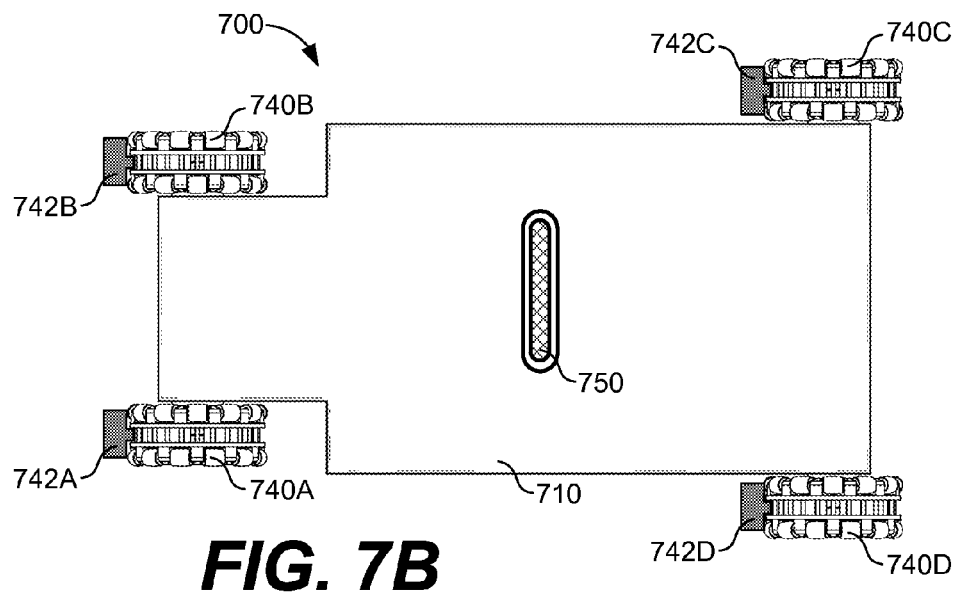
FIG. 7B illustrates a plan view of a bottom of the vehicle shown in FIG. 7A according to various embodiments.

FIG. 7A illustrates an example vehicle 700 including omnidirectional pinion wheels according to various embodiments, and FIG. 7B illustrates a plan view of a bottom of the vehicle 700 in FIG. 7A. While the vehicle 700 is described as one example of a vehicle in which omnidirectional pinion wheels can be used to achieve displacement in three directions, even in small or crowded spaces, it should be appreciated that the concepts of omnidirectional pinion wheels described herein can be applied to other types of vehicles.

The vehicle 700 includes a vehicle platform 710, an extension arm 720, a roller platform 730, wheels 740A-740D, and a retractable lateral displacement roller 750. Among other elements, the vehicle 700 can also include one or more batteries, drive systems, control systems, communications systems, sensors, etc. An example drive system can include motors, engines, gearboxes, transmissions, etc. The wheels 740A-D can be mechanically coupled to the drive system to maneuver and position the vehicle 700. An example control system can include processing and/or computing systems including memory, etc. As described in further detail below, the control system can use feedback from the sensors, such as cameras, radar systems, infrared sensors, etc., to maneuver and position the vehicle 700 through control of the drive system.

In one example mode of operation, the vehicle 700 can be relied upon to pick, place, and transport items from place to place in a warehouse or fulfillment center. In that context, the extension arm 720 can be embodied as a configurable robotic arm capable of moving in various directions within a volume of space. The extension arm 720 can be used to pick or pull items, boxes, pallets, etc., from an adjacent shelf or rack onto the roller platform 730, for transport of the items. Similarly, the extension arm 720 can be used place items, boxes, pallets, etc., from the roller platform 730 onto an adjacent shelf or rack. Thus, the extension arm 720 and the roller platform 730 are one example of a transfer mechanism of the vehicle 700.

It is again noted that, because space in materials handling and other facilities is often limited, many facilities make use of multiple floors, layers, levels, or platforms in rack or shelving structures. Without the use of ramps, elevators, etc., it may not be possible for vehicles in such a facility to reach or traverse across multiple floors or levels. In that context, the wheels 740A-740D of the vehicle 700 are omnidirectional pinion wheels consistent with one or more of the embodiments described herein. Thus, in addition to being able to move forward, backwards, and to the sides, the vehicle 700 can climb vertically between multiple floors, layers, or levels by engaging with a rack or track including a rack gear. In other embodiments, the wheels 740A-740D of the vehicle 700 can be omnidirectional or mecanum wheels. In that case, the vehicle 700 can climb vertically between multiple floors, layers, or levels by engaging with a rack or track including a rack gear formed to engage with the omnidirectional or mecanum wheels.

The vehicle 700 can move forward and backwards in the longitudinal direction in response to rotation of the wheels 740A-740D clockwise or counter-clockwise by the drive system. The vehicle 700 can move sideways in the lateral direction in response to a force perpendicular to the axis of rotation of the wheels 740A-740D, if the wheels 740A-740D include annular rings of rollers similar to those in the wheel 100 in FIG. 1, for example. In that case, the retractable lateral displacement roller 750 can extend down to contact the surface upon which the vehicle 700 is resting, and rotate to provide a lateral (i.e., sideways) force on the wheels 740A-740D. In response to the lateral force, the vehicle 700 will move sideways in the lateral direction by rolling on the annular rings of rollers of the wheels 740A-740D. After providing the sideways force, the retractable lateral displacement roller 750 can retract back into the vehicle platform 710 so as to avoid interfering with forward and backward movement. Alternatively, if the annular rings of rollers of the wheels 740A-740D are independently driven, such as by micro-motors in the wheels 740A-740D, then the lateral displacement roller 750 can be omitted. Further, if the wheels 740A-740D are similar to the wheel 600 in FIG. 6, then the lateral displacement roller 750 can be omitted because the vehicle 700 can be moved sideways in the lateral direction by independently rotating the wheels 740A and 740C in one direction (e.g., clockwise) while rotating the wheels 740B and 740D in an opposite direction (e.g., counter-clockwise), as would be understood for mecanum wheels.

In FIG. 7B, a cross-sectional view of racks 742A-742D is also shown. The racks 742A-742D are shown in engagement with the wheels 740A-740D, respectively. Each of the racks 742A-742D may be similar to the rack 300 shown in FIG. 3 and is positioned to engage with a respective one of the wheels 740A-740D. That is, teeth of the racks 742A-742D can engage into pinion rods of the wheels 740A-740D, for example, so that the vehicle 700 can be displaced vertically (e.g., lowered or raised) between levels. To position the vehicle 700 into engagement with the teeth of the racks 742A-742D, the control system of the vehicle 700 is configured to drive the vehicle 700 forward into the engaged position with the racks 742A-742D. In other words, the wheels 740A-740D are engaged with the racks 742A-742D, respectively, similar to the way that the wheel 100 is engaged with the rack 300 in FIG. 3.

In other embodiments, if the wheels 740A-740D of the vehicle 700 do not include a pinion ring or pinion rods, the racks 742A-742D can be configured to engage with other mechanical features of the wheels 740A-740D. For example, if the wheels 740A-740D of the vehicle 700 are omnidirectional wheels, the racks 742A-742D can be configured to engage with them in a way similar to that described below with reference to FIGS. 12A and 12B, for example.

Although FIGS. 7A and 7B illustrate one arrangement of the wheels 740A-D on the vehicle 700, the arrangement is not intended to be limiting of the embodiments, and the vehicle 700 (and other vehicles) can rely upon other numbers, arrangements, and orientations of omnidirectional pinion wheels. For example, although the wheels 740A and 740B are spaced more closely together than the wheels 740C and 740D, the wheels 740A and 740B could be at the same spacing as the wheels 740C and 740D. In other embodiments, the vehicle 700 could include only three wheels rather than four, with one wheel at one end and the other two wheels at the other end. In another case, the vehicle 700 could include one or more wheels in a first orientation and one or more wheels in a second orientation perpendicular to the first orientation. In that case, if the wheels include annular roller rings, certain wheels could be used for forward and backward displacement while others are used for sideways displacement.

Figure 8A:
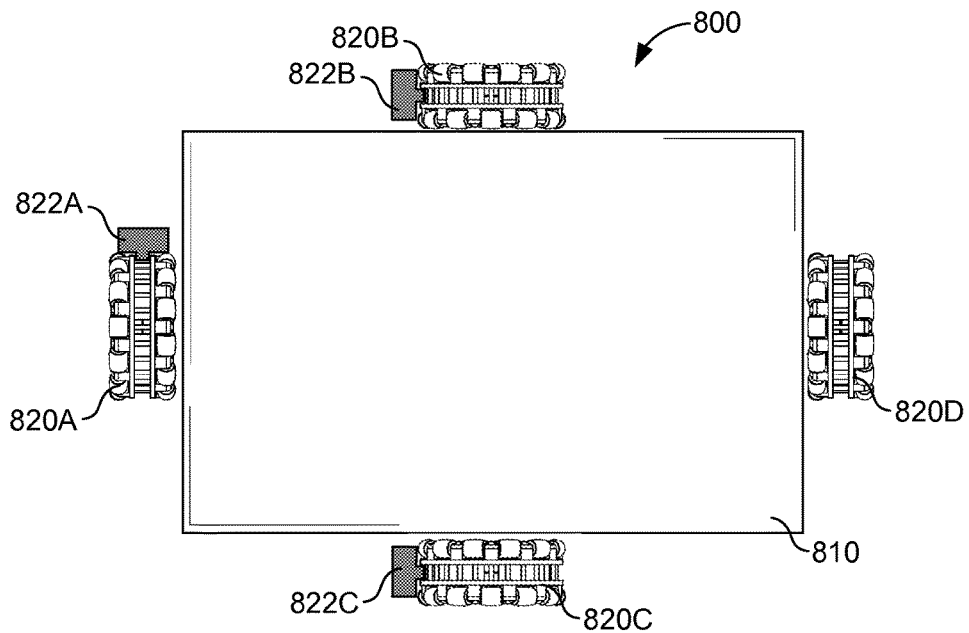
FIGS. 8A-8C illustrate plan views of other arrangements of wheels according to various embodiments.
Figure 8B:
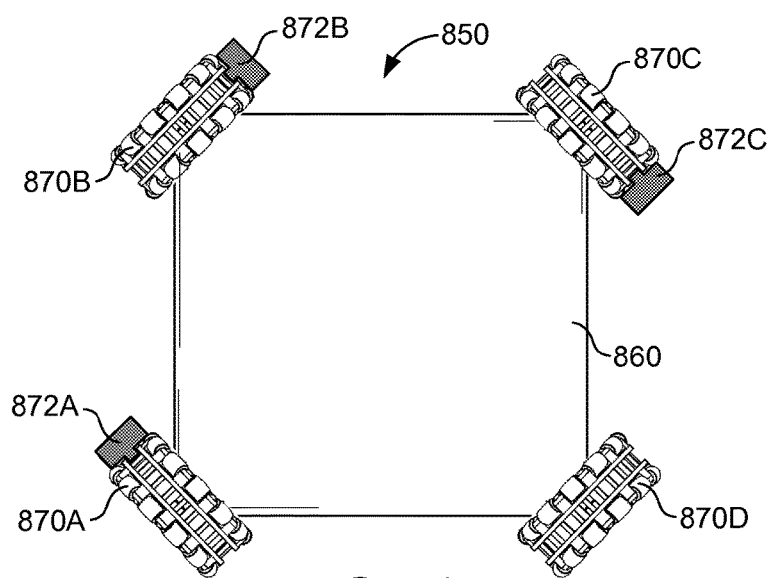
Figure 8C:
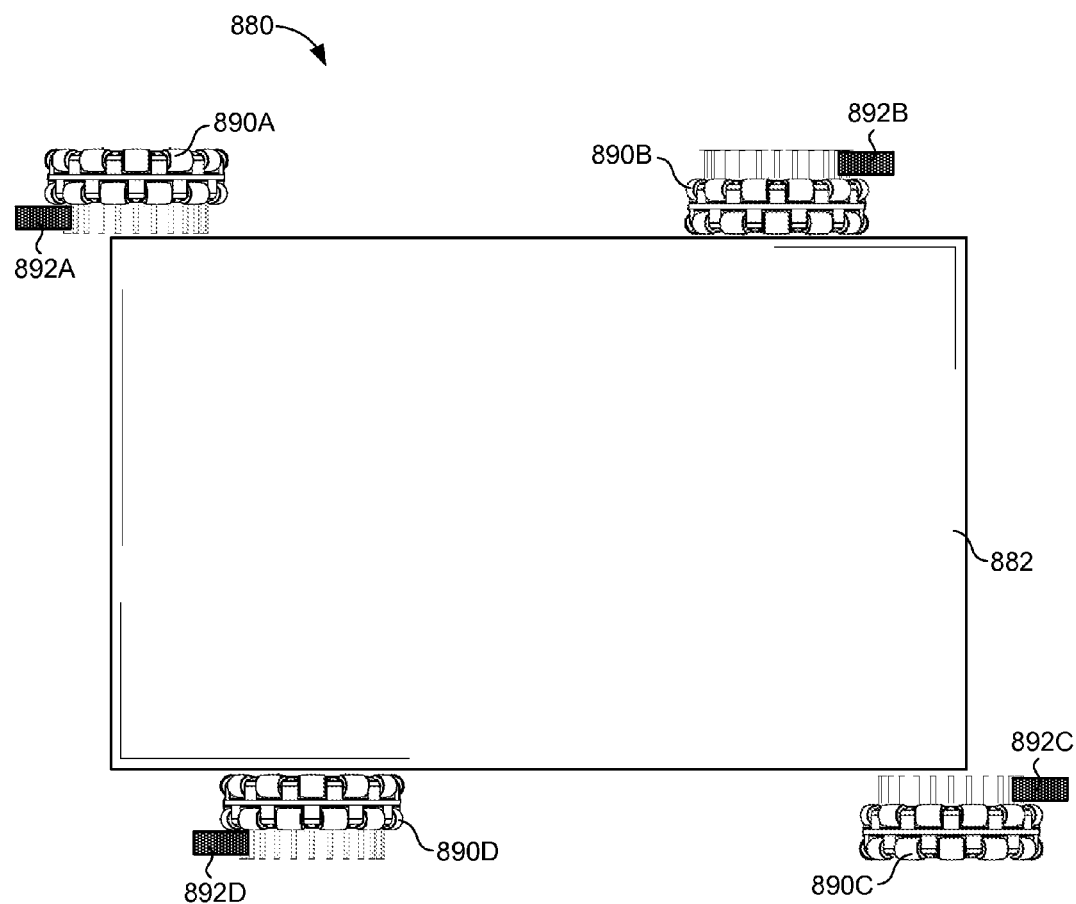

Further, FIGS. 8A-8C illustrate plan views of other arrangements of wheels according to various embodiments. In FIG. 8A, among other components, the vehicle 800 includes a vehicle platform 810 and wheels 820A-820D. While the wheels 820A-820D are shown in FIG. 8A as omnidirectional pinion wheels (i.e., similar to the wheel 100 in FIG. 1), the wheels 820A-820D can be other types of omnidirectional pinion wheels, omnidirectional wheels, mecanum wheels, or other wheels capable of longitudinal and lateral displacement. As shown, the wheels 820A and 820D are placed near the center of opposing sides of the vehicle platform 810, and the wheels 820B and 820C are placed near the center of other opposing sides of the vehicle platform 810. In this configuration, the wheels 820A and 820D can be driven to move the vehicle 800 forward and backward in the longitudinal direction, and the wheels 820B and 820C can be driven to move the vehicle 800 sideways in the lateral direction, for example.

In FIG. 8A, a cross-sectional view of racks 822A-822C in engagement with the wheels 820A-820C, respectively, is also shown. Each of the racks 822A-822C may be similar to the rack 300 shown in FIG. 3. That is, teeth of the racks 822A-822C can engage into pinion rods of the wheels 820A-820C, for example, so that the vehicle 800 can be displaced vertically (e.g., lowered or raised) between levels. To position the vehicle 800 into engagement with the teeth of the racks 822A-822C, a control system of the vehicle 800 is configured to drive the vehicle 800 forward and/or to rotate the vehicle 800, as needed, into the engaged position with the racks 822A-822C. As another example, in FIG. 8B, the vehicle 850 includes a vehicle platform 860 and wheels 870A-870D. In various embodiments, the wheels 870A-870D can be omnidirectional pinion wheels according to any of the embodiments described herein, omnidirectional wheels, mecanum wheels, or other wheels capable of longitudinal and lateral displacement. As shown, each of the wheels 870A-870D is placed at a respective corner of the vehicle platform 810. In this configuration, the wheels 870A and 870C can be driven to move the vehicle 850 forward and backward in the longitudinal direction, and the wheels 870B and 870D can be driven to move the vehicle 850 sideways in the lateral direction, for example.

In FIG. 8B, a cross-sectional view of racks 872A-872C in engagement with the wheels 870A-870C, respectively, is also shown. Each of the racks 872A-872C may be similar to the rack 300 shown in FIG. 3. That is, teeth of the racks 872A-872C can engage into pinion rods of the wheels 870A-870C, for example, so that the vehicle 850 can be displaced vertically (e.g., lowered or raised) between levels. To position the vehicle 850 into engagement with the teeth of the racks 872A-872C, a control system of the vehicle 850 is configured to drive and/or rotate the vehicle 850, as needed, into the engaged position with the racks 872A-872C.

As another example, in FIG. 8C, the vehicle 880 includes a vehicle platform 882 and wheels 890A-890D. The wheels 890A-890D are shown in FIG. 8C as being similar to the omnidirectional pinion wheel 400 in FIG. 4, but can be other omnidirectional pinion wheels, omnidirectional wheels, mecanum wheels, or other wheels capable of longitudinal and lateral displacement. In FIG. 8C, a cross-sectional view of racks 892A-892D in engagement with the wheels 890A-890D, respectively, is also shown. Each of the racks 892A-892D may be similar to the rack 300 shown in FIG. 3. That is, teeth of the racks 892A-892D can engage into pinion rods of the wheels 890A-890D, for example, so that the vehicle 880 can be displaced vertically (e.g., lowered or raised) between levels. To position the vehicle 880 into engagement with the teeth of the racks 892A-892D, a control system of the vehicle 880 is configured to drive the vehicle 880 between the racks 892A-892D and to rotate, e.g., counterclockwise as shown in FIG. 8C, the vehicle 880 into the engaged position with the racks 892A-892D.

Figure 9A:
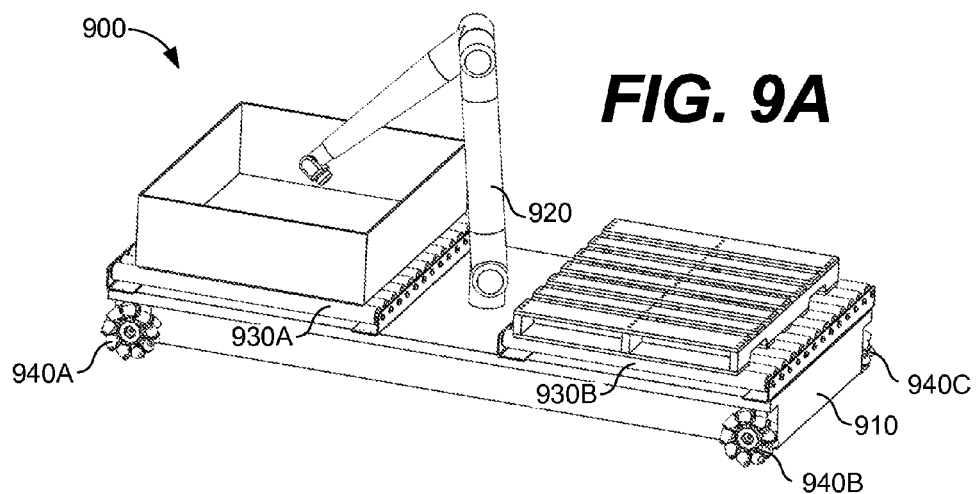
FIG. 9A illustrates another example vehicle including omnidirectional wheels according to various embodiments.

FIG. 9A illustrates another example vehicle 900 including omnidirectional wheels according to various embodiments. The vehicle 900 includes the vehicle platform 910, an extension arm 920, roller platforms 930A and 930B, and wheels 940A-940C (with a fourth wheel omitted from view). Similar to the vehicle 700, the vehicle 900 can also include one or more batteries, drive systems, control systems, communications systems, sensors, etc.

The vehicle 900 can be relied upon to pick, place, and transport items from place to place in a warehouse or fulfillment center. In that context, the extension arm 920 can be used to pick or pull items, boxes, pallets, etc., from an adjacent shelf or rack onto the roller platforms 930A and 930B, for transport of the items. Similarly, the extension arm 920 can be used place items, boxes, pallets, etc., from the roller platforms 930A and 930B onto an adjacent shelf or rack. Thus, the extension arm 920 and the roller platforms 930A and 930B are an example of a transfer mechanism of the vehicle 900.

Figure 9B:
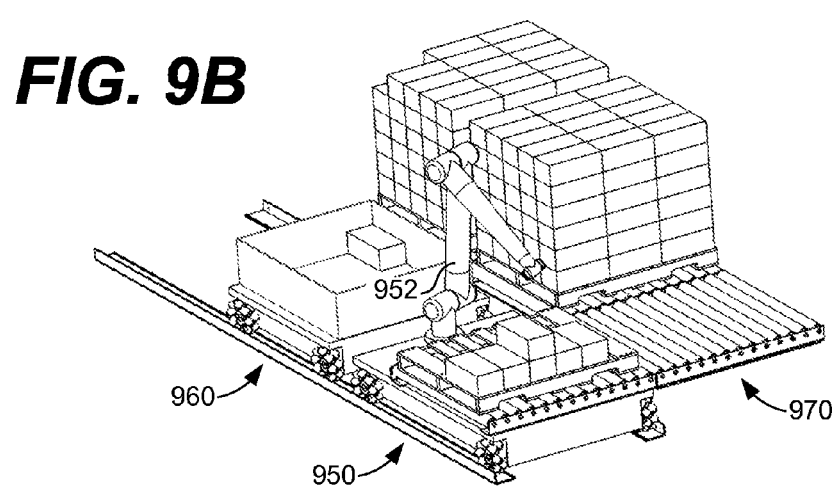
FIG. 9B illustrates a vehicle and a pallet tender transferring items off a rack and onto the vehicle according to various embodiments.

FIG. 9B illustrates a vehicle 950 and a pallet tender 960 transferring items off a rack 970 and onto the vehicle 950 according to various embodiments. The vehicle 950 is similar to the vehicle 700 shown in FIG. 7 and includes an extension arm 952 similar to the extension arm 720. As shown, the extension arm 952 can be used to pick or pull items, boxes, pallets, etc., from the rack 970 and onto the vehicle 950. Alternatively, the items can be first moved (e.g., rolled) from the rack 970 onto the pallet tender 960, and then the extension arm 952 can be used to pick the items from the pallet tender 960 and onto the vehicle 950. In that case, the reach of the extension arm 952 can be effectively increased.

Figure 10A:
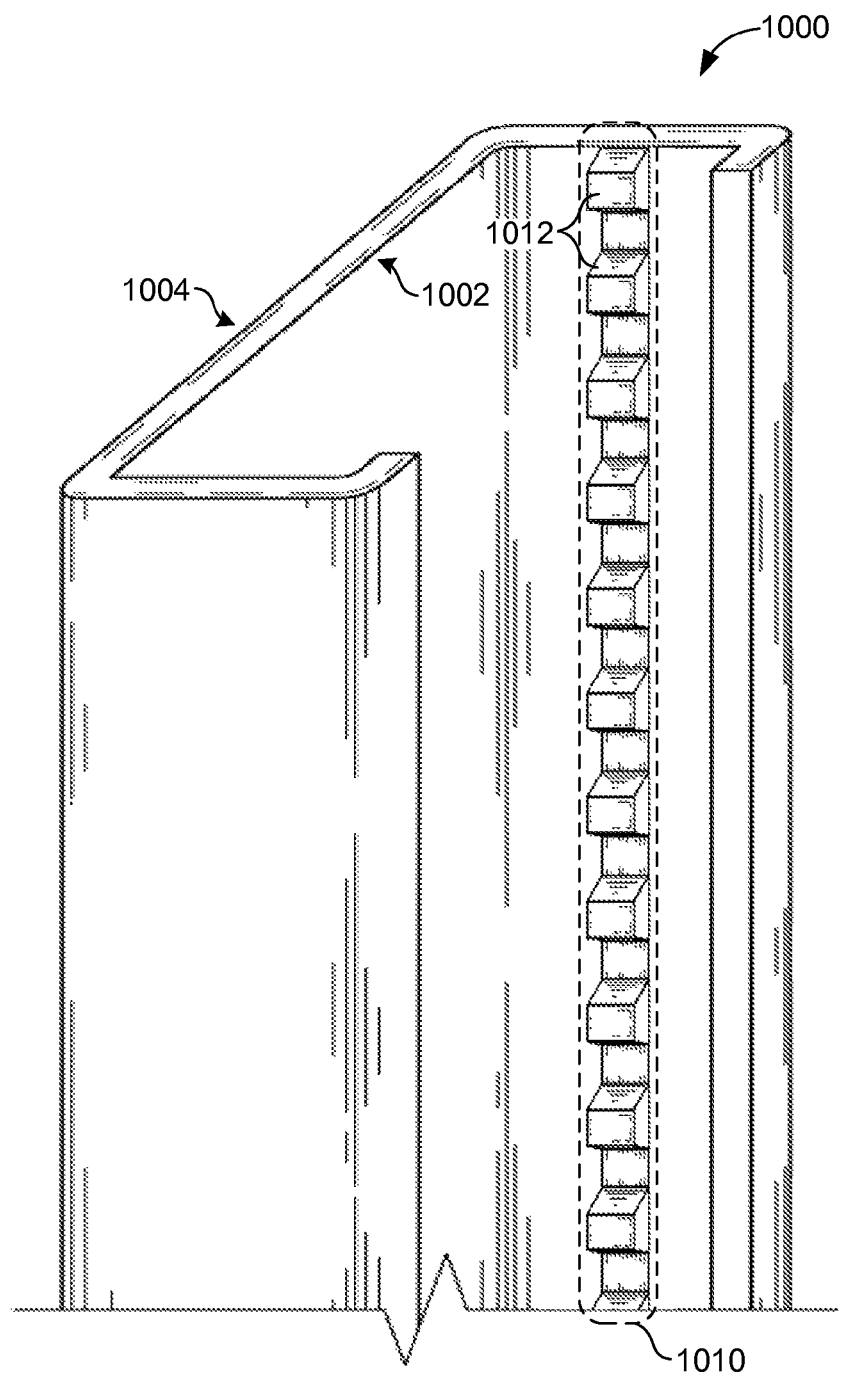
FIG. 10A illustrates a perspective view of an example track for vertical displacement of omnidirectional pinion wheels according to various embodiments.

As an example track that a vehicle consistent with the embodiments described herein can use to achieve vertical displacement, FIG. 10A illustrates a perspective view of a track 1000 for vertical displacement of omnidirectional pinion wheels according to various embodiments. As shown, the track 1000 is formed as a c-shaped, rectangular tube having an opening along one side. The track 1000 includes an inner surface 1002, an outer surface 1004, and a rack gear 1010 that extends along a length of a side of the inner surface 1002. The rack gear 1010 can extend along the entire length of the inner surface 1002 or only along one or more sub-lengths of the inner surface 1002. The rack gear includes teeth 1012 similar to the teeth 310 of the rack 300 in FIG. 3.

The track 1000 can be formed from metal, plastic, or any other suitable material or combination of materials, without limitation. Further, the track 1000, which is not drawn to any particular scale or proportions in FIG. 10A, can be formed to any suitable size, length, and/or width. The track 1000 can also be formed to take any suitable cross-sectional profile shape other than the c-shaped profile shape shown in FIG. 10A, such as full or partial circular, square, rectangular, triangular, or other shapes. Typically, the interior size and profile of the track 1000 is selected or determined to correspond with the size of the omnidirectional pinion wheel that it is designed to accommodate. For example, the size of the track 1000 can be just large enough so that a clearance exists between the inner surface 1002 of the track 1000 and the omnidirectional pinion wheel that fits within the track 1000.

Once an omnidirectional pinion wheel, such as the omnidirectional pinion wheel 100 in FIG. 1, is driven or rotated into the track 1000, the pinion ring of the wheel will engage with the teeth 1012. As the wheel is further rotated, the pinion ring will continue to engage with the teeth 1012, and the wheel can climb vertically within the track 1000. The clearance between the inner surface 1002 of the track 1000 and the wheel within the track 1000 allows the wheel to rotate within the track 1000, but prevents the pinion ring of the wheel from falling away from engagement with the teeth 1012.

Figure 10B:
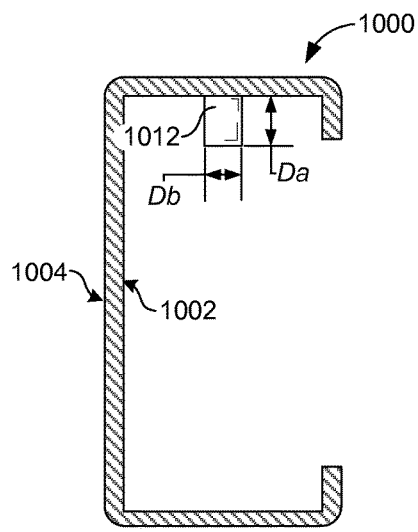
FIG. 10B illustrates a cross-sectional view of the track shown in FIG. 10A according to various embodiments.
Figure 10C:
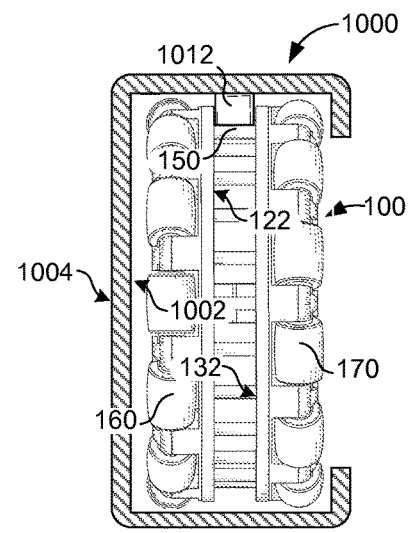
FIG. 10C illustrates a cross-sectional view of the track shown in FIG. 10A with the omnidirectional pinion wheel shown in FIG. 1 inside the track according to various embodiments.

FIG. 10B illustrates a cross-sectional view of the track 1000 in FIG. 10A, and FIG. 10C illustrates a cross-sectional view of the track 1000 with the omnidirectional pinion wheel 100 inside the track 1000. In FIG. 10B, it can be seen that the teeth 1012 extend a distance Da from the inner surface 1002 of the track 1000 toward the interior of the track 1000 and extend a distance Db in width. When used with the wheel 100, the distance Da can be selected to permit sufficient engagement with the pinion rods 150, as shown in FIG. 10C. Thus, it should be appreciated that, in other embodiments, the teeth 1012 can extend a smaller or larger distance Da than that shown in FIG. 10B based on various factors, such as the dimensions of the wheel used with the track 1000, the expected load carrying capacity of the track 1000, and other related factors.

Similarly, the placement of the teeth 1012 along the inner surface 1002 of the track 1000 can vary among embodiments based on the dimensions of the wheel used with the track 1000 and other factors. It is also noted that the width Db of the teeth 1012 can be selected to be slightly smaller than the length X of the pinion rods 150 (FIG. 2), to permit a clearance between the teeth 1012 and the first rim inner surface 122 and the second rim inner surface 132 of the wheel 100.

As shown in FIGS. 10B and 10C, the wheel 100 fits within the track 1000 with a small clearance between the inner surface 1002 and the first and second rollers 160 and 170, to allow the wheel 100 freedom to rotate within the track 1000, but without enough space to allow the pinion rods 150 of the wheel 100 to fall away from engagement with the teeth 1012. Further, a clearance exists between the teeth 1012 and the first rim inner surface 122 and the second rim inner surface 132 of the wheel 100.

Figure 11A:
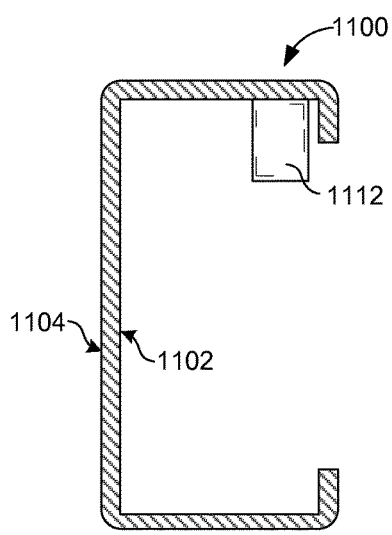
FIG. 11A illustrates a cross-sectional view of another example track according to various embodiments.
Figure 11B:
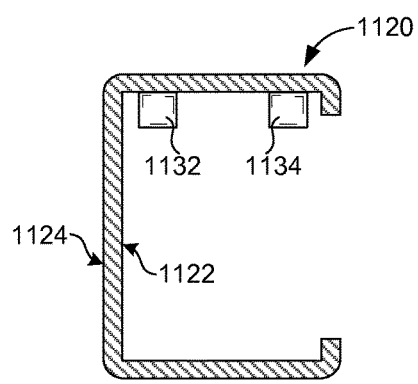
FIG. 11B illustrates a cross-sectional view of another example track according to various embodiments.

As other examples of tracks, FIG. 11A illustrates a cross-sectional view of an example track 1100, and FIG. 11B illustrates a cross-sectional view of an example track 1120. The track 1100 in FIG. 11A includes an inner surface 1102, an outer surface 1104, and a rack gear including teeth 1112 that extend along a length of the inner surface 1102. As compared to the teeth 1012 of the track 1000 shown in FIGS. 10A-10C, the teeth 1112 of the track 1100 shown in FIG. 11A extend further from the inner surface 1102 toward the interior of the track 1100 and extend further in width. The track 1100 can be used with a wheel other than the wheel 100, for example, such as the wheel 400 in FIG. 4. In that case, the teeth 1112 of the track 1100 could engage with the pinion rods 450 of the wheel 400.

The track 1120 in FIG. 11B includes an inner surface 1122, an outer surface 1124, and two rack gears that extend along a length of the inner surface 1122. The first rack gear includes teeth 1132 and the second rack gear includes teeth 1134. As compared to the cross-sectional profiles of the tracks 1000 and 1100, the cross-sectional profile of the track 1120 is closer to a c-shaped square rather than a c-shaped rectangle. It should be appreciated that other variations and differences in profiles of tracks are within the scope of the embodiments. As compared to the teeth 1012 of the track 1000 shown in FIGS. 10A-10C, the teeth 1132 and 1134 of the track 1120 shown in FIG. 11B extend a shorter distance from the inner surface 1122 toward the interior of the track 1120. The track 1120 can be used with a wheel other than the wheel 100, for example, such as a wheel including a pinion ring on both outer sides. Generally, among FIGS. 10A-10C, 11A, and 11B, it can be appreciated that various track profile sizes and shapes are within the scope of the embodiments. Further, various arrangements and sizes of rack gears and teeth configurations are within the scope of the embodiments.

Figure 12A:
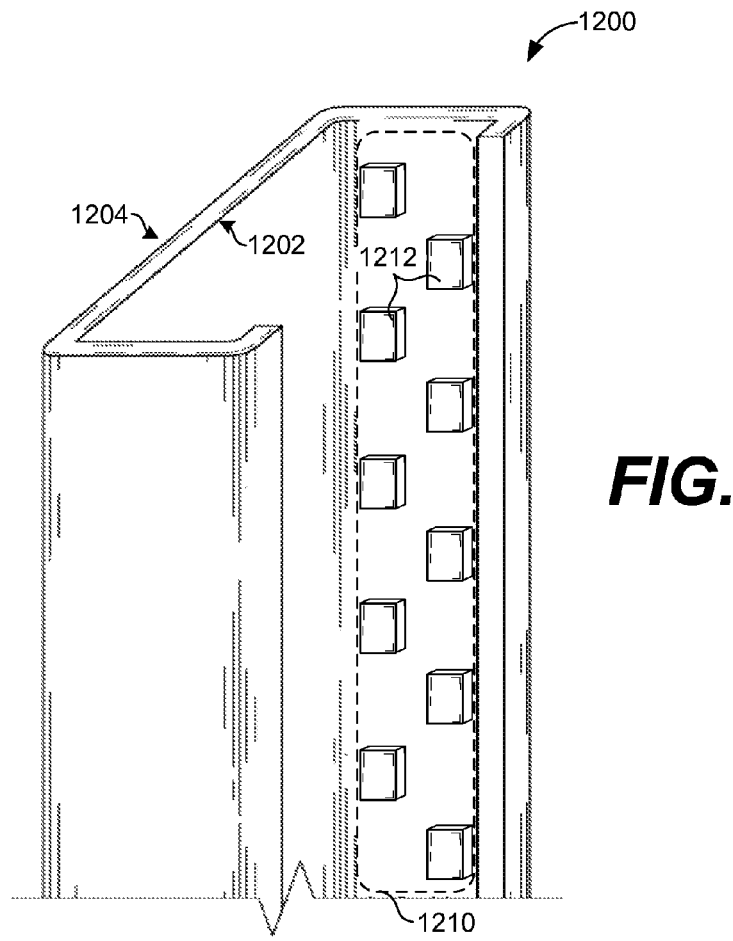
FIG. 12A illustrates a perspective view of an example track for vertical displacement of omnidirectional wheels according to various embodiments.
Figure 12B:
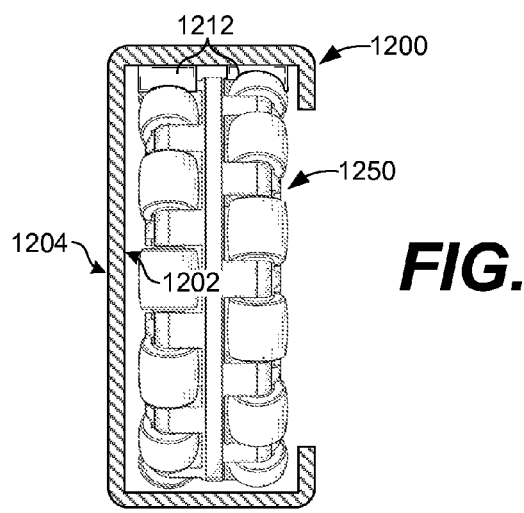
FIG. 12B illustrates a cross-sectional view of the track shown in FIG. 12A with an omnidirectional wheel shown inside the track according to various embodiments.

FIG. 12A illustrates a perspective view of an example track 1200 for vertical displacement of omnidirectional wheels, and FIG. 12B illustrates a cross-sectional view of the track 1200 shown in FIG. 12A with an omnidirectional wheel 1250 shown inside the track 1200. The omnidirectional wheel 1250 is similar to the omnidirectional pinion wheel 100 in FIG. 1, but omits the pinion ring including the pinion rods 150 from its center.

As shown, the track 1200 is formed as a c-shaped, rectangular tube having an opening along one side. The track 1200 includes an inner surface 1202, an outer surface 1204, and a rack gear 1210 that extends along a length of a side of the inner surface 1202. The rack gear 1210 can extend along the entire length of the inner surface 1202 or only along one or more sub-lengths of the inner surface 1202. The rack gear includes teeth 1212 formed to engage with omnidirectional wheels.

The track 1200 can be formed from metal, plastic, or any other suitable material or combination of materials, without limitation. Further, the track 1200, which is not drawn to any particular scale or proportions in FIG. 12A, can be formed to any suitable size, length, and/or width. The track 1200 can also be formed to take any suitable cross-sectional profile shape other than the c-shaped profile shape shown in FIG. 12A, such as full or partial circular, square, rectangular, triangular, or other shapes. Typically, as shown in FIG. 12B, the interior size and profile of the track 1200 is selected or determined to correspond with the size of the omnidirectional wheel 1250 that it is designed to accommodate. For example, the size of the track 1200 can be just large enough so that a clearance exists between the inner surface 1202 of the track 1200 and the omnidirectional wheel 1250 that fits within the track 1200.

The rack gear 1210 is formed or configured to engage with the omnidirectional wheel 1250. Thus, once an omnidirectional wheel, such as the omnidirectional wheel 1250, is driven or rotated into the track 1200, the omnidirectional wheel will engage with the teeth 1212. For example, as shown in FIG. 12B, as the omnidirectional wheel 1250 is rotated in the track 1200, the teeth 1212 engage or lodge between the spaces among the rollers of the omnidirectional wheel 1250. Thus, from a first, surface level, for example, the omnidirectional wheel 1250 can be rotated or driven in engagement with the track 1200 to raise a vehicle to a second, elevated level.

It is noted that the shape, sizing, and placement of the teeth 1212 along the inner surface 1202 of the track 1200 can vary among embodiments based on the dimensions of the wheel used with the track 1200 and other factors. For example, the teeth 1212 could take on a different shape, size, and placement when formed to engage with a mecanum wheel, e.g., to engage with and/or between individual rollers of a mecanum wheel as shown in FIG. 6, while omitting the pinion rods 650, the first ring rim 652, and the second ring rim 654.

Figure 13A:
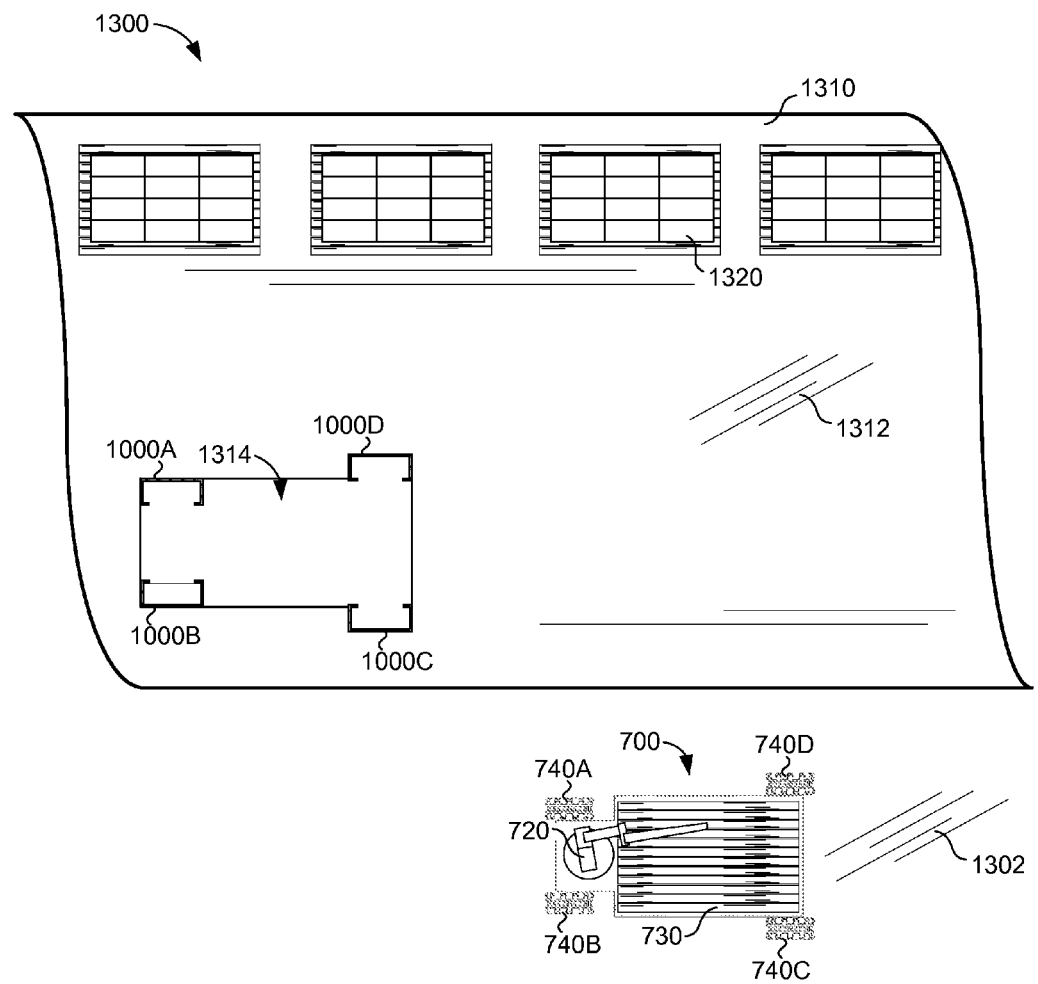
FIG. 13A illustrates a plan view of an example system for omnidirectional transport according to various embodiments.

FIG. 13A illustrates a plan view of an example system 1300 for omnidirectional transport according to various embodiments. In the system 1300, the vehicle 700 in FIG. 7A is resting upon a first or surface level 1302, which may be in a materials handling facility, for example, or another type of facility. The system 1300 also includes a rack system 1310 having a second or elevated level 1312. Although the system 1300 is shown as having first and second levels 1302 and 1310, the rack system 1310 could include any number of levels separated from each other by any suitable distances.

An opening 1314, which is similar in size to that of the vehicle 700, is formed through the second level 1312. The tracks 1000A-1000D, each of which are similar to the track 1000 in FIG. 10A, extend up from the first level 1302 to the second level 1312. The tracks 1000A-1000D are positioned at locations that correspond to the locations of the omnidirectional pinion wheels 740A-740D of the vehicle 700. Again, although the system 1300 is shown as having the tracks 1000A-1000D extend between the first and second levels 1302 and 1310, the system 1300 could include any number of levels with various arrangements of tracks extending between them.

According to aspects of omnidirectional transport described herein, the control system is configured to direct the drive system of the vehicle 700 to maneuver the vehicle 700 in longitudinal and lateral directions over the first level 1302. Similarly, to move the vehicle vertically onto the second level 1312 of the rack system 1310, the control system is configured to position the vehicle 700 under the opening 1314 for engagement between the omnidirectional pinion wheels 740A-740D and the tracks 1000A-1000D. Once engaged, the control system is configured to drive the omnidirectional pinion wheels 740A-740D in engagement with the tracks 1000A-1000D to raise the vehicle 700 to the second level 1312.

Once at the second level 1312, the control system is configured to maneuver the vehicle 700 to transfer an item 1320 onto the roller platform 730 of the vehicle 700 at the second level 1312. For example, the extension arm 720 can be used to pick or pull the item 1320 (and other items) onto the vehicle 700. In other embodiments, other transfer mechanisms can be used to pick or pull items onto the vehicle 700 or other vehicles consistent with those described herein.

After the item 1320 is on the vehicle 700, the control system is configured to position the vehicle 700 for engagement between the omnidirectional pinion wheels 740A-740D and tracks 1000A-1000D at the second level 1312. Then, the control system is configured to drive the omnidirectional pinion wheels 740A-740D in engagement with the tracks 1000A-1000D to lower the vehicle 700 to the first level 1302. Once at the first level 1302, the extension arm 720 can be used to pick or pull the item 1320 (and other items) off the vehicle 700.

Figure 13B:
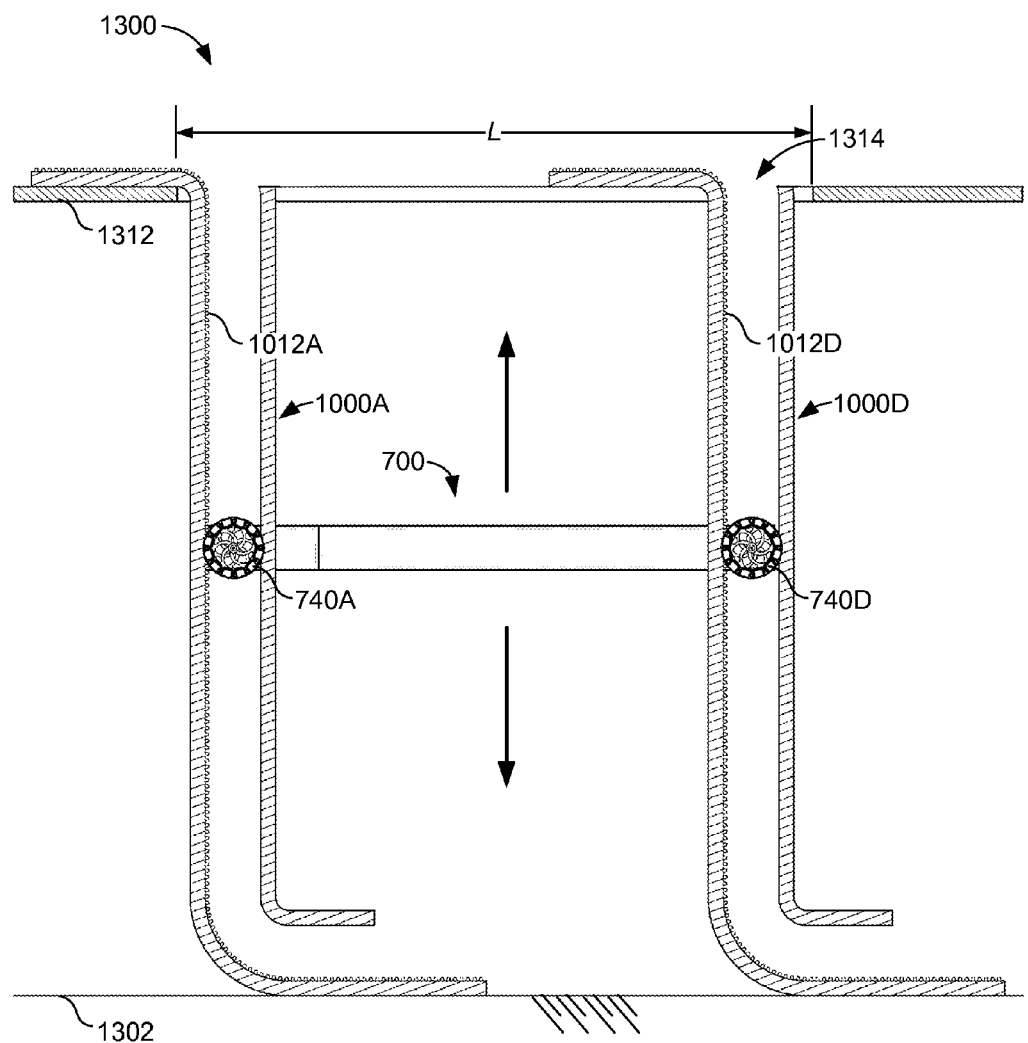
FIG. 13B illustrates a side view of part of the example system shown in FIG. 13A according to various embodiments.

FIG. 13B illustrates a side view of part of the example system 1300 shown in FIG. 13A according to various embodiments. In FIG. 13B, the two tracks 1000A and 1000D are shown. The tracks 1000A and 1000B extend substantially vertically from the first level 1302 to the second level 1312. In other embodiments, the tracks 1000A and 1000B (or other tracks) could extend at various angles and/or curve from one or more surfaces in the system 1300. The opening 1314 in the second level 1312 is of length L larger than the length of the vehicle 700. The track 1000A includes a rack gear with teeth 1012A, and the track 1000D includes a rack gear with teeth 1012D. The extension arm 720 and roller platform 730 of the vehicle 700 are omitted from view in FIG. 13B, for simplicity.

Near the first level 1302, the tracks 1000A and 1000D curve to extend at least a length along the first level 1302, with an opening of the tracks 1000A and 1000D at one end at the first level 1302. Near the second level 1312, the tracks 1000A and 1000D open, with a length of the teeth 1012A and 1012D extending along the second level 1312.

In FIG. 13B, the vehicle 700 is shown with the wheels 740A and 740D engaged with the teeth 1012A and 1012D within the tracks 1000A and 1000D, respectively. Although not shown in FIG. 13B, the wheels 740B and 740C are engaged within the tracks 1000B and 1000C, respectively. Due to the engagement with the teeth 1012A and 1012D, when the wheels 740A-740D of the vehicle 700 are driven or rotated counter-clockwise, the vehicle 700 will rise or be vertically displaced upwards toward the second level 1312. Likewise, when the wheels 740A-740D of the vehicle 700 are driven or rotated clockwise, the vehicle 700 will lower or be vertically displaced downwards toward the first level 1302. Here, it should be appreciated that, if the teeth 1012A and 1012D were formed on the other side of the tracks 1000A and 1000D, then the wheels 740A-740D would be rotated clockwise to raise the vehicle 700 and counter-clockwise to lower the vehicle 700.

The vehicle 700 can rotate the wheels 740A-740D clockwise and counter-clockwise using its drive system. For example, motors of the drive system can be controlled at the direction the control system of the vehicle, as described above, which can include one or more computing and/or control systems. The vehicle 700 can rely upon closed loop motor control and sensor feedback to synchronously actuate the motors to maintain a level or other suitable orientation of the vehicle 700 during vertical displacement. In some embodiments, the motors can generate energy as the vehicle 700 displaces or maneuvers from the second level 1312 to the first level 1302.

Once on either of the first level 1302 or the second level 1312, the vehicle 700 is free to move about the level in any direction, as described herein. That is, it should be appreciated that, based on the concepts of omnidirectional wheels described herein, the wheels 740A-740D of the vehicle 700 can be relied upon to move the vehicle forwards, backwards, or sideways on either of the first level 1302 or the second level 1312. Further, to move between the first level 1302 and the second level 1312, the vehicle 700 can position and engage the tracks 1000A and 1000D at one level, and drive to the other level based on engagement with the teeth 1012A and 1012D, according to the concepts described herein.

It is noted that other omnidirectional transport systems can use other types of vehicles, other types of wheels, and other types, shapes, sizes, and configurations of tracks, rails, and racks consistent with those described herein. Further, other omnidirectional transport systems can include multiple levels of surfaces and vertical tracks to be traversed by omnidirectional vehicles.

Figure 14:
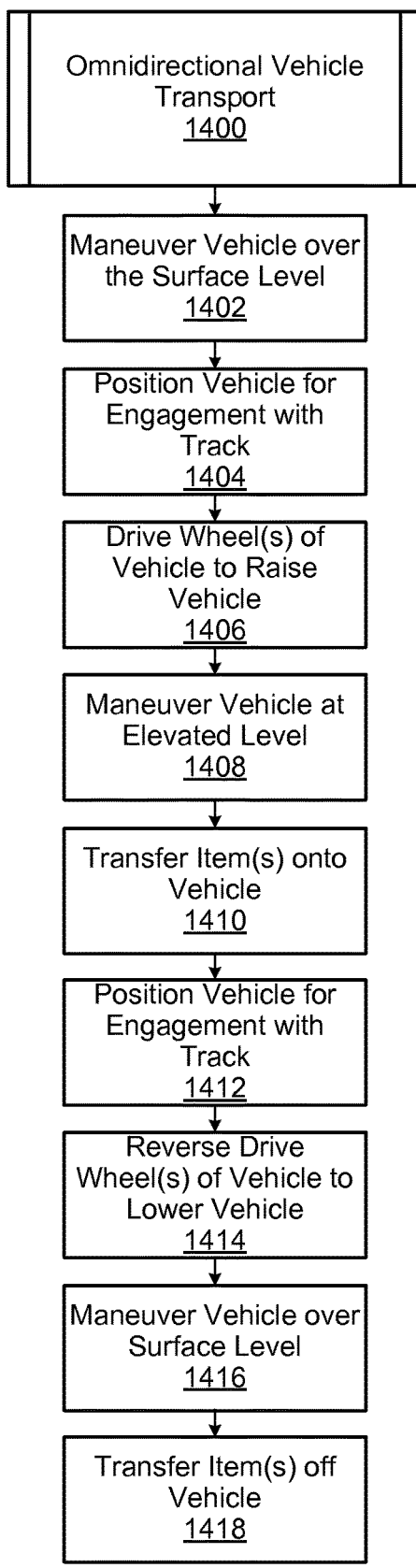
FIG. 14 illustrates an example process of omnidirectional vehicle transport performed using the system 1300 shown in FIGS. 13A and 13B according to an example embodiment described herein.

FIG. 14 illustrates an example process 1400 of omnidirectional vehicle transport performed using the system 1300 shown in FIGS. 13A and 13B according to an example embodiment described herein. In certain aspects, the process flowchart in FIG. 14 can be viewed as depicting an example set of steps performed by the vehicle 700 in the system 1300. The flowchart in FIG. 14 provides merely one example of a sequence or arrangement of steps that can be employed for omnidirectional vehicle transport consistent with the concepts described herein. Although the process 1400 is described in connection with the vehicle 700 in the system 1300, other vehicles, tracks, racks, etc. consistent with those described herein can be used perform the process 1400 or similar processes.

At reference numeral 1402, the process 1400 includes maneuvering the vehicle 700 in any longitudinal and lateral directions, for example, over the first level 1302 using the wheels 740A-740D of the vehicle 700. For example, the control system can direct the drive system of the vehicle 700 to drive the wheels 740A-740D in any suitable manner to maneuver the vehicle 700 as needed.

At reference numeral 1404, the process 1400 includes positioning the vehicle 700 for engagement between the wheels 740A-740D and the tracks 1000A-1000D at the first level 1302. Here, the control system can direct the drive system of the vehicle 700 to drive the vehicle 700 into position under the opening 1314 and into engagement between the wheels 740A-740D and the teeth of the tracks 1000A-1000D. The positioning can include driving the vehicle 700 between the tracks 1000A-1000D so that the wheels 740A-740D engage with the tracks 1000A-1000D. In that configuration, the vehicle 700 can traverse between the first level 1302 and the second level 1312. As needed, the positioning can include driving, rotating, or a combination of driving and rotating the vehicle 700 into engagement with the tracks 1000A-1000D.

At reference numeral 1406, the process 1400 includes driving the wheels 740A-740D in engagement with the tracks 1000A-1000D to raise the vehicle 700 to the second level 1312. Further, at reference numeral 1408, the process 1400 includes maneuvering the vehicle 700 at the second level 1312 to transfer at least one item, such as the item 1320, onto the vehicle 700 at the second level 1312. For example, once at the second level 1312, the control system is configured to maneuver the vehicle 700 proximate to the item 1320, so that the extension arm 720 can pick the item 1320.

At reference numeral 1410, the process 1400 includes transferring the item 1320 onto the vehicle 700 at the second level 1312. For example, the extension arm 720 can be used to pick or pull the item 1320 (and other items) onto the vehicle 700. In other embodiments, other transfer mechanisms can be used to pick or pull items onto the vehicle 700.

At reference numeral 1412, the process 1400 includes maneuvering and positioning the vehicle 700, with the item 1320 on the vehicle 700, for engagement between the wheels 740A-740D and the tracks 1000A-1000D at the second level 1312. Here, the control system can direct the drive system of the vehicle 700 to drive the vehicle 700 into position over the opening 1314 and into engagement between the wheels 740A-740D and the teeth of the tracks 1000A-1000D. The positioning can include driving the vehicle 700 between the tracks 1000A-1000D at the second level so that the wheels 740A-740D engage with the tracks 1000A-1000D. As needed, the positioning can include driving, rotating, or a combination of driving and rotating the vehicle 700 into engagement with the tracks 1000A-1000D.

At reference numeral 1414, the process 1400 includes driving the wheels 740A-740D to lower the vehicle 700 to the first level 1302. At reference numeral 1416, the process 1400 includes maneuvering the vehicle 700 in any longitudinal and lateral directions, for example, over the first level 1302 using the wheels 740A-740D of the vehicle 700. For example, the control system can direct the vehicle 700 to move to a location for transport or delivery of the item 1320. At reference numeral 1418, the process 1400 includes transferring the item 1320 off the vehicle 700 at the first level 1302.

Although embodiments have been described herein in detail, the descriptions are by way of example. The features of the embodiments described herein are representative and, in alternative embodiments, certain features and elements can be added or omitted. Additionally, modifications to aspects of the embodiments described herein can be made by those skilled in the art without departing from the spirit and scope of the present invention defined in the following claims, the scope of which are to be accorded the broadest interpretation so as to encompass modifications and equivalent structures.

Therefore, at least the following is claimed:

1. A wheel, comprising:
   a hub comprising a center bore that extends in a first direction;
   a first annular rim comprising a first rim inner surface and a first rim outer surface;
   a second annular rim comprising a second rim inner surface and a second rim outer surface, the first rim inner surface being spaced apart from the second rim inner surface by a distance in the first direction;
   a first plurality of spokes that extend radially away from the hub to the first annular rim;
   a second plurality of spokes that extend radially away from the hub to the second annular rim;

a plurality of pinion rods that extend between and separate the first rim inner surface and the second rim inner surface by the distance in the first direction, the plurality of pinion rods being substantially evenly spaced along the first annular rim and the second annular rim;

a first annular ring of rollers comprising a first plurality of rollers arranged in a first ring and affixed to the first rim outer surface; and a second annular ring of rollers comprising a second plurality of rollers arranged in a second ring and affixed to the second rim outer surface.

2. The wheel according to claim 1, wherein:
the first annular ring of rollers is affixed apart in the first direction from the first rim outer surface;
the second annular ring of rollers is affixed apart in the first direction from the second rim outer surface;
at least one roller of the first plurality of rollers is affixed to the first rim outer surface through an axle that provides a rotational axis of freedom about an axis of symmetry of the at least one roller; and
a direction of the axis of symmetry of the at least one roller is substantially orthogonal to the first direction of the center bore of the hub.

3. The wheel according to claim 1, wherein:
the first annular ring of rollers is symmetrically offset from the second annular ring of rollers; and
the first annular ring of rollers and the second annular ring of rollers extend a greater distance radially away from the hub than the first annular rim and the second annular rim.

4. A wheel, comprising:
a hub having an axis of symmetry that extends in a first direction;
a first annular rim and a second annular rim;
a wheel body that extends radially away from the hub to one of the first annular rim or the second annular rim;
an annular ring of rollers comprising a plurality of rollers arranged in a ring around and affixed to an outer surface of one of the first annular rim or the second annular rim, at least one roller among the plurality of rollers having a rotational axis of freedom about an axle secured to the outer surface of the one of the first annular rim or the second annular rim; and
a plurality of pinion rods that extend in the first direction between and separate an inner surface of the first annular rim and an inner surface of the second annular rim.

5. The wheel according to claim 4, wherein the wheel body comprises a plurality of spokes that extend radially away from the hub to the annular rim.

6. The wheel according to claim 4, wherein the plurality of pinion rods form a pinion ring that extends between and separates the inner surface of the first annular rim and the inner surface of the second annular rim.

7. The wheel according to claim 4, wherein a direction of the rotational axis of freedom of the at least one roller is substantially orthogonal to the first direction in which the plurality of pinion rods extend.

8. The wheel according to claim 7, wherein:
the wheel can be displaced on a surface in a direction substantially orthogonal to the first direction in response to rotation of the wheel about the axis of symmetry of the hub; and
using the rotational axis of freedom of the at least one roller, the wheel can be displaced on the surface in the first direction in response to a force on the wheel in the first direction.

9. The wheel according to claim 4, further comprising:
a second wheel body that extends radially away from the hub to another one of the first annular rim or the second annular rim; and
a second annular ring of rollers comprising a second plurality of rollers arranged in a ring around and affixed to an outer surface of another one of the first annular rim or the second annular rim.

10. The wheel according to claim 9, wherein the annular ring of rollers is symmetrically offset from the second annular ring of rollers.

11. A system, comprising:
a vehicle comprising at least one wheel, wherein the at least one wheel comprises:
a hub comprising an axis of symmetry that extends in a first direction;
a first annular rim and a second annular rim;
a wheel body that extends radially away from the hub to one of the first annular rim or the second annular rim;
an annular ring of rollers comprising a plurality of rollers arranged in a ring around and affixed to an outer surface of one of the first annular rim or the second annular rim, at least one roller among the plurality of rollers having a rotational axis of freedom about an axle secured to the outer surface of the one of the first annular rim or the second annular rim; and
a plurality of pinion rods that extend between and separate an inner surface of the first annular rim and an inner surface of the second annular rim; and
at least one track comprising a rack gear formed to engage with the at least one wheel of the vehicle to raise or lower the vehicle.

12. The system according to claim 11, wherein the at least one wheel fits within the at least one track with a clearance between the at least one track and the annular ring of rollers of the at least one wheel.

13. The system according to claim 11, wherein:
the hub has an axis of symmetry that extends in a first direction; and
the plurality of pinion rods extend between the first annular rim and the second annular rim in the first direction.

14. The system according to claim 13, wherein the plurality of pinion rods form a pinion ring that extends between and separates the inner surface of the first annular rim and the inner surface of the second annular rim.

15. The system according to claim 13, wherein:
at least a length of the at least one track extends vertically; and
the plurality of pinion rods of the at least one wheel can engage with the rack gear of the at least one track for vertical displacement of the vehicle.

16. The system according to claim 11, wherein:
the vehicle comprises a plurality of wheels;
the at least one track comprises a plurality of tracks, at least one of the plurality of tracks including the rack gear;
individual ones of the plurality of wheels fit within respective ones of the plurality of tracks with a clearance; and
the at least one wheel can engage with the rack gear for vertical displacement of the vehicle.

17. The system according to claim 11, wherein the at least one wheel further comprises:

a second wheel body that extends radially away from the hub to another one of the first annular rim or the second annular rim; and a second annular ring of rollers comprising a second plurality of rollers arranged in a ring around and affixed to an outer surface of another one of the first annular rim or the second annular rim.

18. The system according to claim 17, wherein the annular ring of rollers is symmetrically offset from the second annular ring of rollers.

19. The system according to claim 11, wherein the annular ring of rollers is affixed apart in the first direction from the outer surface of the one of the first annular rim or the second annular rim.

20. The system according to claim 19, wherein the at least one wheel further comprises a second annular ring of rollers affixed apart in the first direction from an outer surface of another one of the first annular rim or the second annular rim.

* * * * *